United States Patent
Hiramatsu et al.

(10) Patent No.: US 6,304,835 B1
(45) Date of Patent: Oct. 16, 2001

(54) SIMULATION SYSTEM USING MODEL

(75) Inventors: Shigeki Hiramatsu, Hiroshima; Yasuhiro Harada, Hiroshima-ken; Hiroyuki Arakawa, Kure; Satoshi Komori, Higashihiroshima; Shizuo Sumida, Hiroshima, all of (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/390,654

(22) Filed: Sep. 7, 1999

Related U.S. Application Data

(63) Continuation of application No. PCT/JP98/04750, filed on Oct. 20, 1998.

(30) Foreign Application Priority Data

Mar. 31, 1998 (JP) .................................................. 10-104129

(51) Int. Cl.[7] .............................. G06G 7/48; G06G 7/50
(52) U.S. Cl. ....................................... 703/7; 703/8; 703/9
(58) Field of Search ................................. 703/6, 7, 8, 9

(56) References Cited

U.S. PATENT DOCUMENTS

| 5,249,151 | * | 9/1993 | Chang et al. | 703/7 |
| 5,431,261 | * | 7/1995 | Olgac | 188/379 |
| 5,651,341 | * | 7/1997 | Harada et al. | 123/339.2 |

FOREIGN PATENT DOCUMENTS 9-91334    4/1997  (JP) .

OTHER PUBLICATIONS

IEEE, Crossley, P. R. et al. "A nonlinear engine model for drivetrain system development," Control 1991, Control 1991, International Conference, pp. 921–925, vol. 2.

IEEE, Jung–ho Kim, et al. "Autotool, a PC–based object-t-oriented automotive powertrain simulation tool," Intelligent Transportation System, Nov. 9–12, 1997, pp. 753–758.

Barsoum et al.; "Observation and simulation of a large signal mechanical vibrating system"; Comp. Methods in Appl. Mech. and Engineering; vol. 135; pp. 1–13, Aug. 1986.*

Lee: "Flexural vibration of an orthotropic rotating shaft moving over supports"; J. Sound and Vibration; vol. 179; pp. 347–357, Jan. 1995.*

Ellis et al.: "Two numerical issues in simulating constrained dynamics"; IEEE 1992 Int. Conf. Proc. Robotics and Automation; pp. 312–318, May 1992.*

Shigeki Hiramatsu, et al. Modeling of Power Train by Applying the Virtual Prototype Concept, 974, (Oct. 1997), cover pg., pp. 177–180, and end page (brief English Abstract on p. 177).

* cited by examiner

*Primary Examiner*—Kevin J. Teska
*Assistant Examiner*—Hugh Jones

(57) ABSTRACT

This invention proposes a simulation apparatus which can simulate by easily coping with changes in component and model. A simulation apparatus simulates, using a system model, the dynamic performance of a target apparatus to be simulated, which includes a driving source and is constructed by a plurality of units for transmitting the driving force output from the driving source, and expresses the target apparatus by functional and data models. The functional model expresses each of units that construct the target apparatus by exchange of energy by the dynamic performance of that unit, and a parameter which determines that dynamic performance. The parameter for each unit is computed using static characteristic data read out from a memory, thus expressing each unit as a data model.

30 Claims, 37 Drawing Sheets

CLOSED LOOP SYSTEM

OPEN LOOP SYSTEM

X : STATE VARIABLE VECTOR
O : OBSERVED STATE VARIABLE VECTOR
I : INPUT VECTOR (INCLUDING CONNECTED STATE VARIABLE)

CONNECTED STATE VARIABLE→DELETE $$\begin{bmatrix} X'(t) \\ O \end{bmatrix} = \begin{bmatrix} A & B \\ C & D \end{bmatrix} * \begin{bmatrix} X(t) \\ I \end{bmatrix}$$

CONTINUOUS-TIME SYSTEM MODEL

FIG. 17

CONVERSION $$P = \exp(Ats)$$
$$= E + Ats + A^2 ts^2/2! + \cdots + A^n ts^n/n! + \cdots$$
$$Q = \int_0^{ts} B\exp(A\eta)\,d\eta$$
$$= \{E + Ats/2! + \cdots + A^n ts^n/(n+1)! + \cdots\} Bts$$

E : UNIT MATRIX
ts = SAMPLING TIME

FIG. 18

| X(k+1) | | P | Q | | X(k) |
|---|---|---|---|---|---|
| 0 | = | C | D | * | 1 |

DISCRETE-TIME SYSTEM MODEL

Model (block diagram)

Indicial response of model $T_C = \mu * R_E * F_C$ $T_C$ : TORQUE CAPACITY
$F_C$ : PRESSURE
$\mu$ : COEFFICIENT OF FRICTION
$R_E$ : EFFECTIVE DIAMETER J fp : INERTIA OF FRONT PINION
D fp : VISCOUS COEFFICIENT OF FRONT PINION
ω fp : ROTATIONAL ANGULAR VELOCITY OF FRONT PINION

TORQUE CONVERTER

SIMULATION SYSTEM USING MODEL

This continuing application is filed under 35 U.S.C. §111(a), based upon International Application PCT/JP98/04750, filed Oct. 20, 1998, which PCT/JP98/04750 application in turn claims priority based upon Japanese Patent Application 10/104129, filed Mar. 31, 1998.

BACKGROUND OF THE INVENTION

1. Field of the Invention

The present invention relates to a simulation apparatus and the like and, more particularly, to a simulation apparatus which can efficiently model and simulate a system including complicated combinations of a plurality of elements or components like a power train of a vehicle, and the like.

2. Description of the Related Art

For the purpose of shortening the time required for product development, it is becoming increasingly important to perform estimation and confirmation of performance and functions, which are conventionally done by tests using samples, during the initial period of development.

Various kinds of performance of a vehicle appear as integrated characteristics of individual units such as an engine, gear box, and the like. Since these characteristics stretch across a plurality of different fields, different theoretical systems are combined and modeled by a unique method that meets the purpose of simulation. However, it is not efficient to fulfill simulations against many problems and to maintain and manage them.

To solve this problem, a modeling technique which is common to different fields and can easily integrate them is required.

The present inventors have proposed a technique for expressing each component by concepts called potential and flow variables using a system equation in Japanese Patent Application No. 7-250974 and the like, thereby expressing a unit built by a plurality of components as a matrix.

SUMMARY OF THE INVENTION

The present invention has been made as an extension of and based on the above proposal, and has as its object to provide a simulation apparatus which can simulate while easily coping with changes in component and model.

In order to achieve the above object, as proposed in claim 1, a simulation apparatus for simulating, using a system model, dynamic performance of a target apparatus to be simulated including a driving source and a plurality of units for transmitting a driving force output from the driving source, said simulation apparatus comprising:

functional modeling means for representing each of the units included in the target apparatus by exchange of energy by dynamic performance of an individual unit and a parameter that determines the dynamic performance of the unit;

data storage means for storing static characteristic data of each unit; and data modeling means for computing a parameter of each unit on the basis of static characteristic data for the unit read out from said data storage means.

According to claim 2 as a preferred aspect of the present invention, the parameter of each unit represents at least one of a mass, spring, and damper. In an embodiment to be described later, the mass is an inertial mass, the spring is rigidity, and the damper is a viscous coefficient.

According to claim 3 as a preferred aspect of the present invention, the functional modeling means represents the dynamic performance of each unit by a matrix.

According to claim 4 as a preferred aspect of the present invention, the apparatus further comprises further comprising means for integrating matrices representing dynamic performances of the individual units generated by said functional modeling means into a matrix representing the entire target apparatus.

According to claim 5 as a preferred aspect of the present invention, the dynamic performance of each unit is expressed by a state equation.

According to claim 6 as a preferred aspect of the present invention, the data modeling means converts static characteristic data read out from the data storage means into a parameter in accordance with a progressive state of a simulation of the unit.

According to claim 7 as a preferred aspect of the present invention, the individual units are represented as being coupled to each other via a potential variable that expresses a potential, and a flow variable that expresses a flow.

According to claim 8 as a preferred aspect of the present invention, the parameter includes a state variable of each unit, and a state change variable upon infinitesimal state transition. Since the state change is that in the infinitesimal state, even when each unit is nonlinear, accurate simulation can be done while assuring linearity.

According to claim 9 as a preferred aspect of the present invention, each unit performs a nonlinear operation.

According to claim 10 as a preferred aspect of the present invention, the apparatus further comprises a number of data modeling means equivalent to said data modeling means, said number being set in correspondence with types of units.

According to claim 11 as a preferred aspect of the present invention, the dynamic performance is expressed by a time in a discrete system, and the parameter of each unit is approximated to a zero-th order (constant) per unit time.

The object of the present invention is also achieved by a simulation apparatus of claim 12.

Especially, according to the simulation apparatus of claim 13, since data modeling is done for each unit, simulation precision and the degree of freedom in a control system can be improved.

The object of the present invention is also achieved by a simulation method of claim 14.

BRIEF DESCRIPTION OF THE DRAWINGS

FIG. 17 is a view for explaining the principle of converting the system equations of the integrated units into a discrete-time system;

FIG. 18 is a view for explaining the principle of converting the system equations of the integrated units into a discrete-time system;

DETAILED DESCRIPTION OF THE PREFERRED EMBODIMENT

A simulation system according to a preferred embodiment of the present invention will be described hereinafter with reference to the accompanying drawings.

<Potential Variable and Flow Variable>

The basic of unit expression as a characteristic feature of a simulation apparatus of this embodiment will be explained below.

Figure 1:
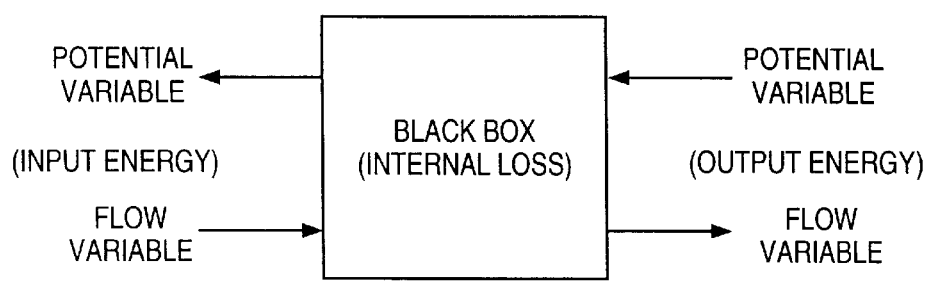
FIG. 1 is a diagram for explaining a scheme for expressing a unit by potential and flow variables, which scheme has been proposed by the present inventors in Japanese Patent Application No. 7-250974, and is used in a simulation apparatus according to an embodiment of the present invention.

Partial functions that built a system of a given entity are modeled as system elements which exchange energy. If a certain partial function is instantiated as a black box, as shown in FIG. 1, the energy model is defined by the internal loss of the black box, input energy to that block box, and output energy from that black box, and is given by:

Input energy=output energy+internal loss

The input energy and output energy are respectively expressed by state variables consisting of potential and flow variables. The potential variable is a state variable that represents the potential component of input/output energy with respect to the entity, and the flow variable is a state variable that represents the flow component of input/output energy with respect to the entity.

The state variable is expressed by a pair of input and output state variables. The input state variable is expressed by an input potential or flow variable, and the output state variable is expressed by an output potential or flow variable. That is, input/output energy is expressed by a pair of an input potential variable and an output flow variable or a pair of an input flow variable and an output potential variable.

Table 1 below summarizes an example of the potential and flow variables.

TABLE 1

| Energy Characteristics | Potential Variable | Flow Variable |
|---|---|---|
| Rectilinear Motion | Velocity | Load |
| Rotation | Angular Velocity | Torque |
| Fluid | Flow Rate | Pressure |
| Acoustic | Sound Flow | Sound Pressure |
| Electricity | Voltage | Current |

The energy model will be explained in more detail below. If a function of a motor is instantiated as a black box, and a current (value) is supplied to the flow variable of input energy, the potential variable of the input energy side is described as a voltage (value) corresponding to the internal resistance and output of the motor. In this case, the current is the input flow variable, the voltage is the output potential variable, and (current×voltage) is the input energy. More specifically, if the rotational torque remains the same, the voltage rises and the rotational speed of the motor increases as the current flows more. On the other hand, a torque is output as an output flow variable, and the angular velocity of the motor is returned as an input potential variable. In this case, the output energy is given by (torque ×angular velocity).

Another way of describing this model example is that a current is returned (output) as a flow variable by inputting a voltage as a potential variable. In this case, the arrows in FIG. 1 are reversed, i.e., the voltage is the input potential variable and the current is the output flow variable.

Figure 2:
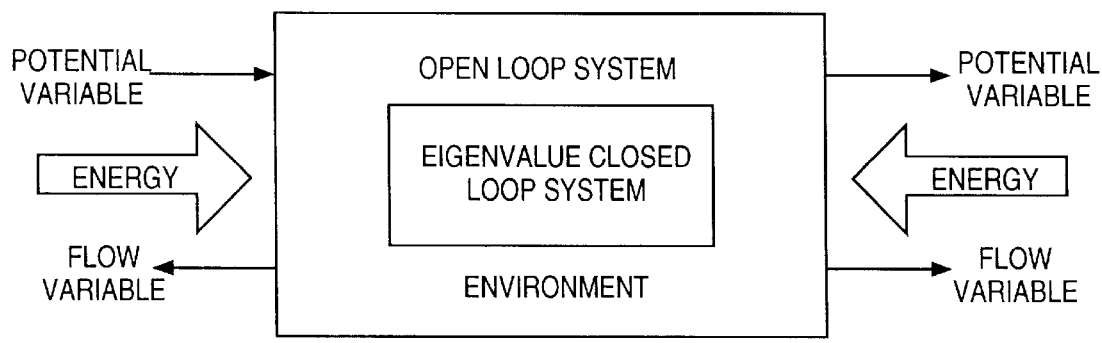
FIG. 2 is a diagram for explaining another scheme for expressing a unit by potential and flow variables, which scheme has been proposed by the present inventors in Japanese Patent Application No. 7-250974, and is used in a simulation apparatus according to the embodiment of the present invention.
Figure 3:
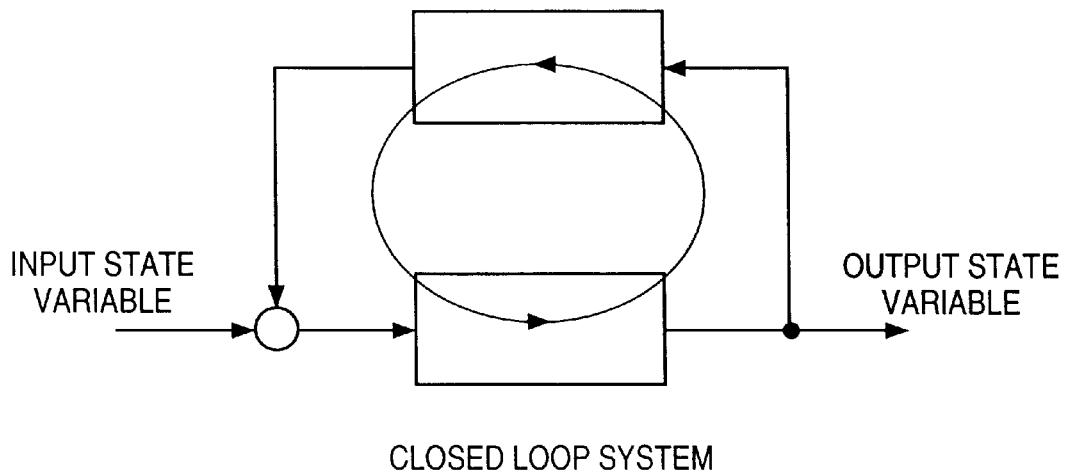
FIG. 3 is a diagram for explaining a scheme for expressing a unit by a closed loop system.
Figure 4:
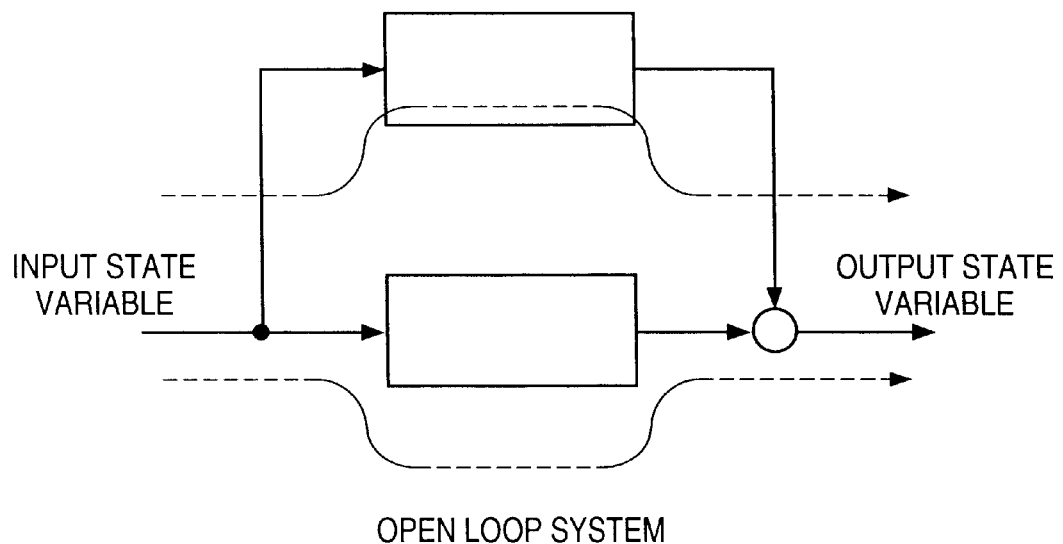
FIG. 4 is a diagram for explaining a scheme for expressing a unit by an open loop system.

The interior of the black box that expresses the entity is constructed by a closed loop system (eigenvalue system) that defines the characteristics of that entity, and an open loop system that defines the characteristics of an environment which supplies input energy to the closed loop system, as shown in FIG. 2. In the closed loop system, as shown in FIG. 3, a permanent loop of the state variable is formed by feeding back the output state variable to the input state variable, and internal elements included in this loop settle an eigenvalue. In the open loop system, as shown in FIG. 4, the input state variable is applied to the output state variable to form a state variable flow, which settles the flow between an external state variable serving as input energy applied to the entity, and an internal state variable serving as input energy of the eigenvalue. Hence, an energy group applied to the entity applies potential and flow input energy groups to the environment system, and the potential and flow energy groups are applied to the eigenvalue system via the environment system.

In this way, all the partial functions that construct a product are expressed by energy models as system elements, which are combined to have a given connection relationship, thus modeling the product.

A virtual prototype to be described below is achieved on the basis of the aforementioned findings.

<Concept of Virtual Prototype>

Figure 5:
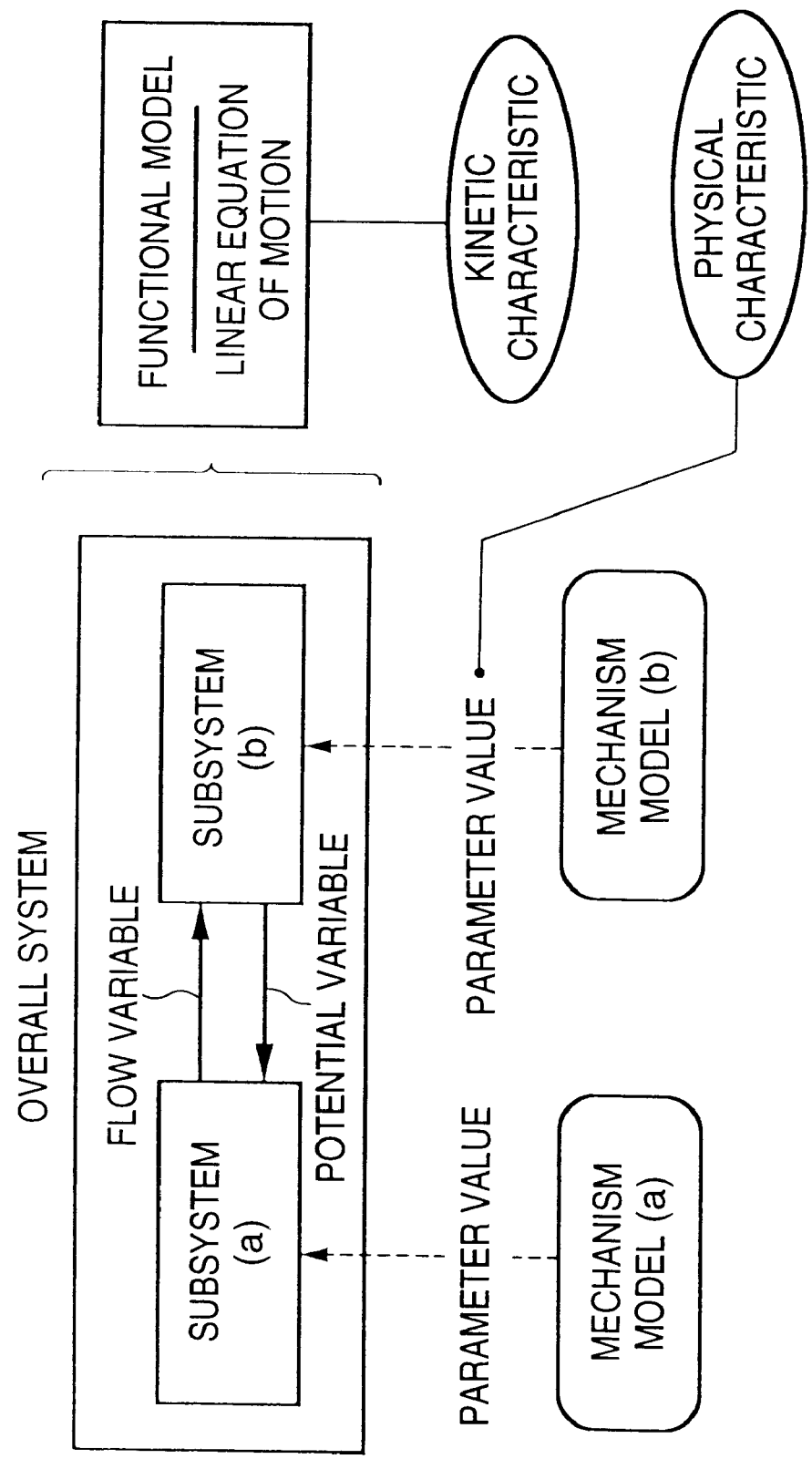
FIG. 5 is a view for explaining the concept of a virtual prototype used in the embodiment of the present invention.

FIG. 5 shows the conceptual arrangement of a virtual prototype.

In a model based on the virtual prototype, its contents are hierarchically classified into a "functional model" and "mechanism model".

The functional model is described by the two generalized state variables, i.e., the "potential variable" and "flow variable" mentioned above. The "functional model" expresses the dynamic characteristics of an entity to be modeled, and plays a role of forming an integrated system by integrating subsystems. In the example of FIG. 5, the integrated system is built by subsystems (a) and (b).

The "mechanism model" gives physical characteristics to be substituted in parameters of the functional model, and depends on the mechanism of an entity.

The hierarchical model arrangement can model the overall function by integrating models of subsystems by a common method without troubling ourselves about handling of mechanism models which are normally complicated.

The function model is expressed by a system equation, and updates and discretizes parameters given by the mechanism model in response to each sampling clock. Hence, any nonlinearity of the characteristics resulting from a mechanism is linearized by the functional model at each sampling time.

<Basic Model of Power Train>

A power train includes elements such as a clutch, brake, and the like, which discontinuously switch model mechanisms by connecting/disconnecting models. Such structural change will be referred to as "structural nonlinearity" hereinafter.

Assuming a model that does not contain any structural nonlinearity, and an example of an arrangement constituted by functional and mechanism models, integration of subsystems into an integrated system, and solutions will be explained below.

Figure 6:
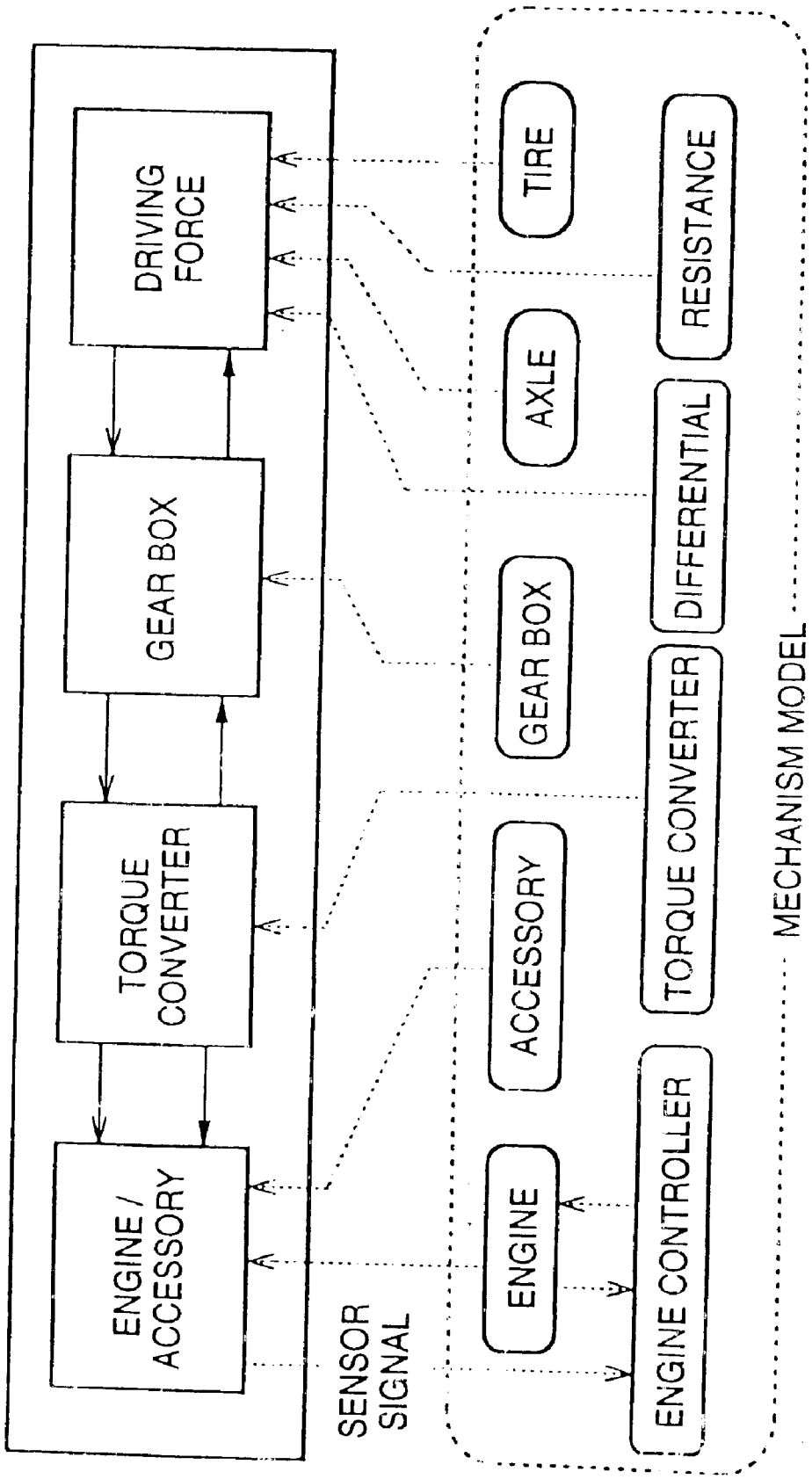
FIG. 6 is a view for explaining the arrangement of a power train to which the concept of the virtual prototype shown in FIG. 5 is applied.

The integrated model of the power train is constructed by four functional models, i.e., "engine & accessory", "torque converter", "gear box", and "driving force", as shown in FIG. 6. These functional models are coupled to mechanism models of the engine, torque converter, and the like via parameters. Note that the gear box is simplified to a reduction gear ratio alone.

Adjacent functional models are coupled via a torque and force as flow variables, and a rotation and velocity as potential variables.

<Driving Resistance Model of Engine & Accessory>

Figure 7:
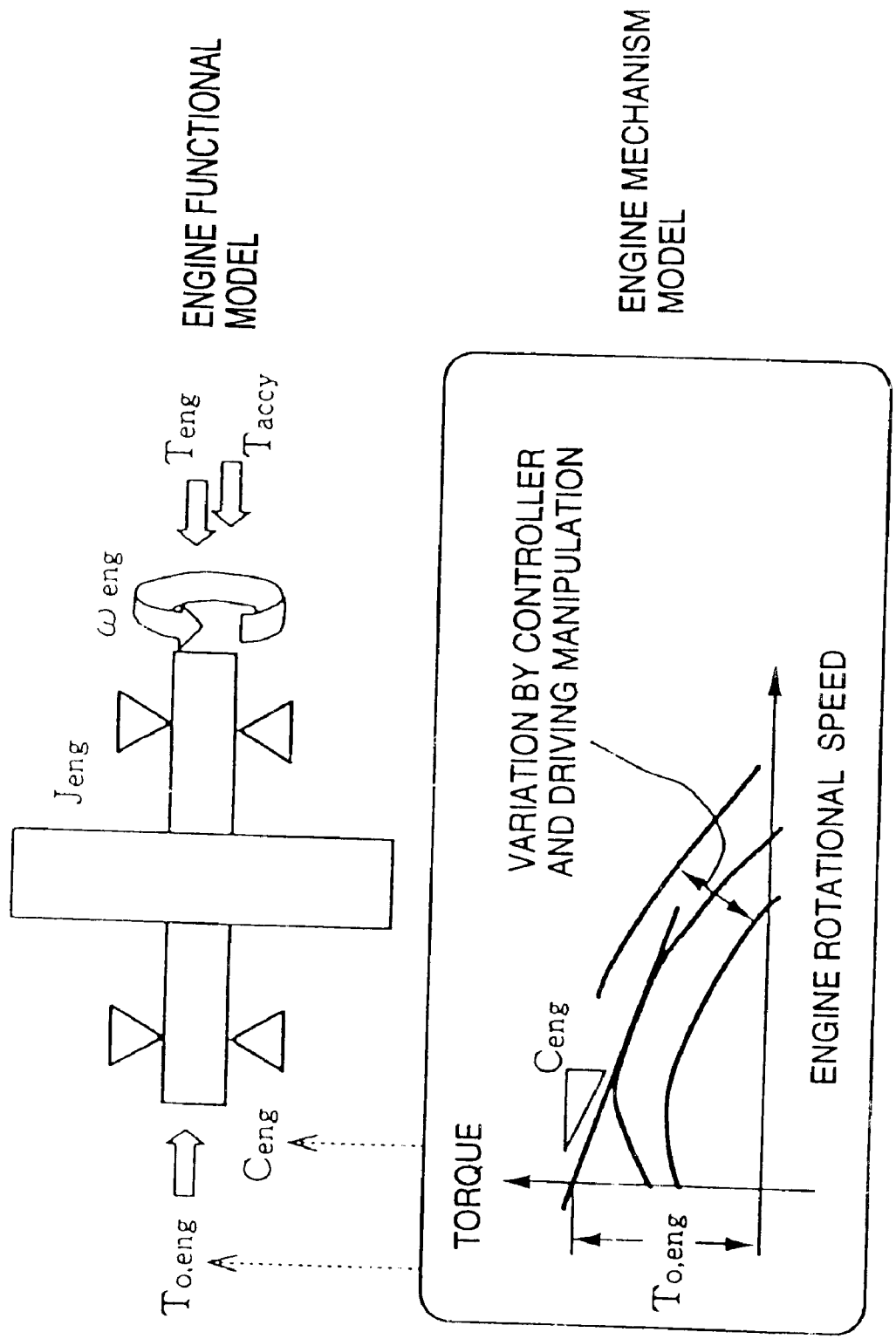
FIG. 7 is a view showing an engine model to which the virtual prototype is applied.

An engine functional model is expressed as a first-order delay system consisting of a moment $J_{eng}$ of inertia and viscous drag coefficient $C_{eng}$, as shown in FIG. 7.

An engine mechanism model gives the torque characteristics of the engine and the driving resistance of the accessory as the viscous drag coefficient and an offset value $T_{o.eng}$ as a frictional component of the drag to the functional model. The engine functional model contains an electronic control model that considers transient responses to a control input and driver's manipulation input, but does not consider any unstable phenomenon such as accidental fire.

A system equation of the engine functional model is given by:

$$[\, X'_{eng} \quad O_{eng} \,]^T = \begin{bmatrix} A_{eng} & B_{eng} \\ C_{eng} & D_{eng} \end{bmatrix} \times [\, X_{eng} \quad I_{eng} \,]^T \quad \text{(EQ 1)}$$

Note that "'" represents a time differentiation in the above and subsequent equations.

Since $X_{eng}$ is a state vector and there is only one state variable $X_{eng}$, we have:

$$X_{eng} = [X_{eng}] \quad \text{(EQ2)}$$

Figure 8:
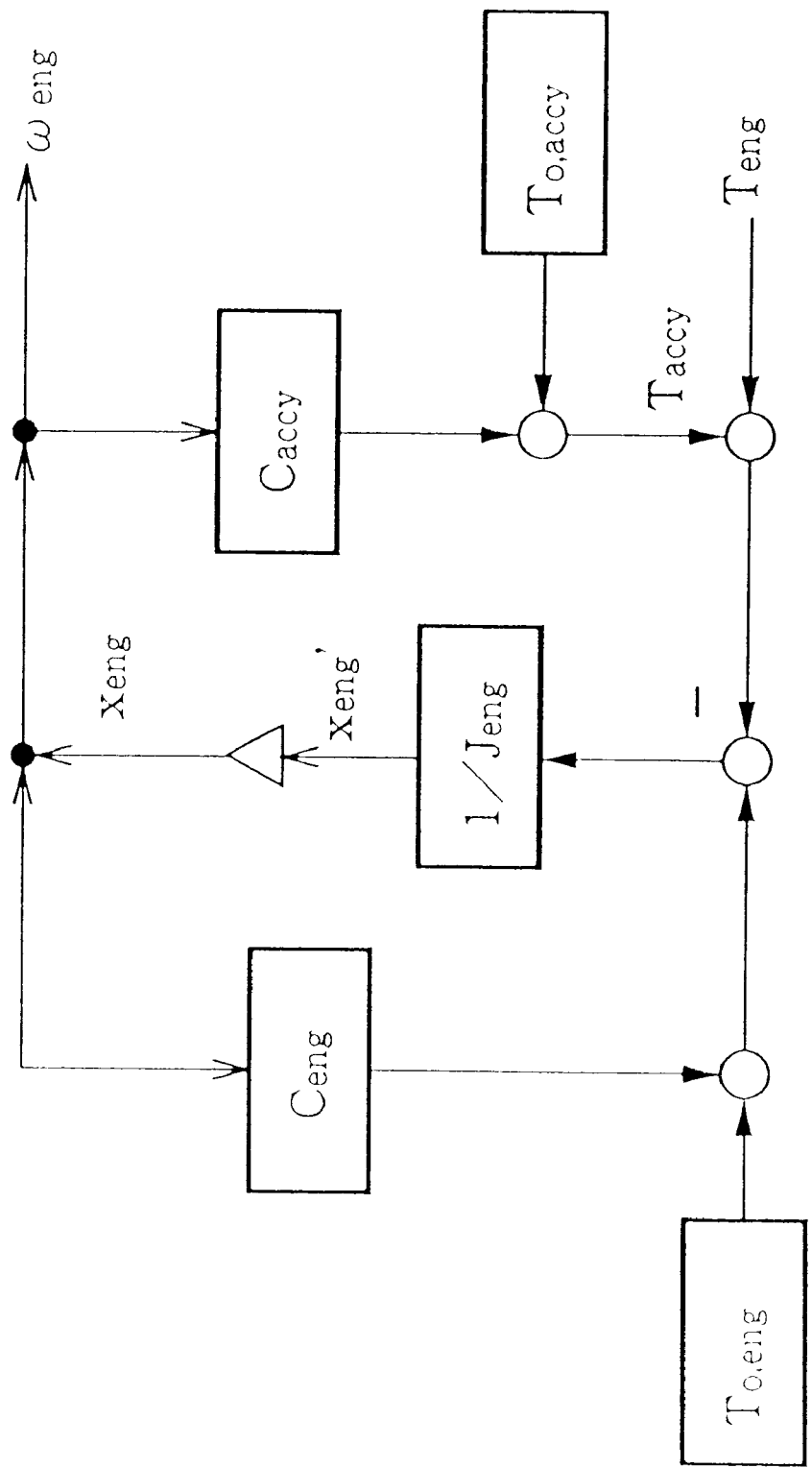
FIG. 8 is a block diagram showing a functional model of the engine shown in FIG. 7.

When the functional model of the engine accessory is expressed by the block diagram shown in FIG. 8, the observation vector $O^{eng}$ and external input vector $I_{eng}$ for extracting state variables are respectively given by:

$$O_{eng}=[\omega_{eng} T_{accy}]^T I_{eng}=[1 T_{eng}]^T \quad (EQ3)$$

where $T_{eng}$ is the engine torque, $\omega_{eng}$ is the rotational speed of the engine, and $T_{accy}$ is the output torque to the accessory. Hence, parameters of the model that form a partial matrix are respectively given by:

$$A_{eng} = \left[\frac{1}{J_{eng}}(C_{eng} - C_{accy})\right] \quad (EQ\ 4)$$

$$B_{eng} = \left[\frac{1}{J_{eng}}(T_{O.eng} - T_{O.accy}) - \frac{1}{J_{eng}}\right] \quad (EQ\ 5)$$

$$C_{eng} = \begin{bmatrix} 1 \\ C_{accy} \end{bmatrix}$$

$$D_{eng} = \begin{bmatrix} 0 & 0 \\ T_{O.accy} & 0 \end{bmatrix} \quad (EQ\ 6)$$

Figure 9:
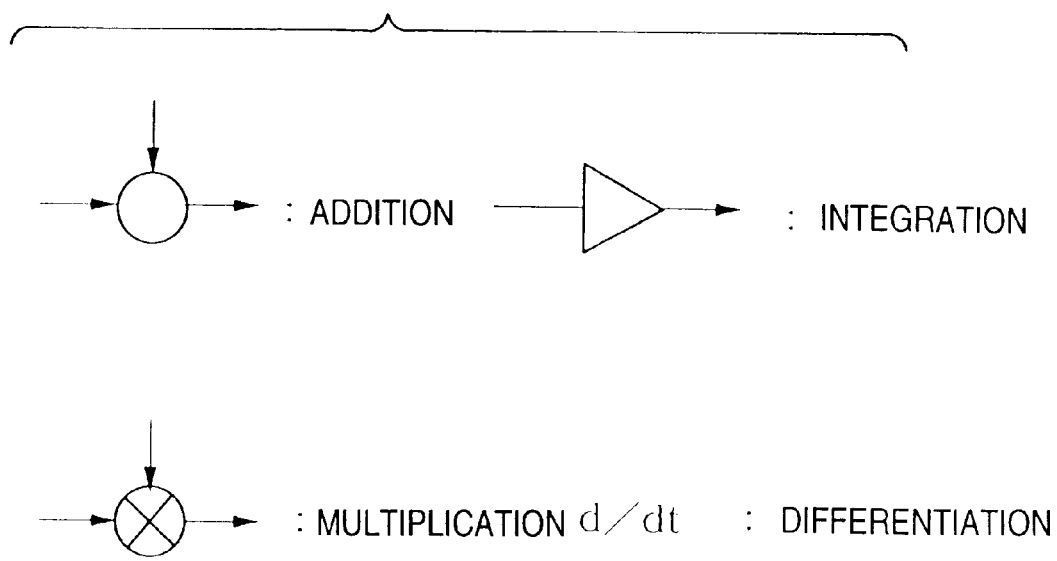
FIG. 9 is a view for explaining symbols used in the embodiment of the present invention.

Note that FIG. 9 shows symbols used in the system block diagrams of this embodiment as well as FIG. 8.

<Model of Torque Converter>

Upon modeling the torque converter, the torque converter is divided into a pump and turbine, and the former is rigidly coupled to the engine and the latter to the axle. Transient behavior of fluid in the torque converter is ignored.

The driving torque of the torque converter is given, using a capacitive coefficient $C_{cp}$ having a velocity ratio e between the pump and turbine as a variable, by:

$$T_{eng}=C_{cp}(e)\cdot\omega_{eng}^2 \quad (EQ7)$$

Figure 10:
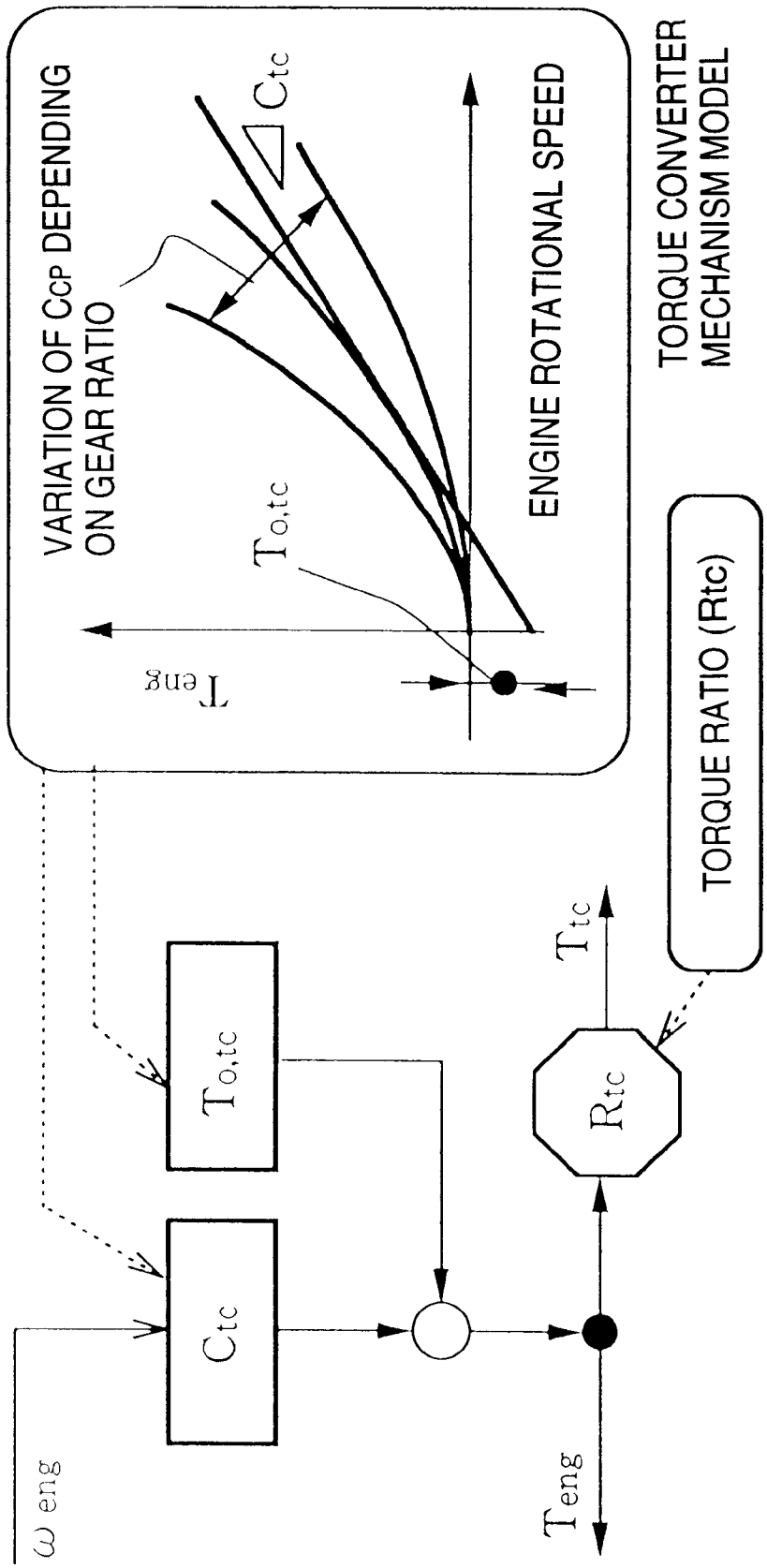
FIG. 10 is a block diagram showing a model of a torque converter to which the virtual concept is applied.

The mechanism model calculates a tangent to a driving torque curve shown in the graph in FIG. 10, and gives a slope $C_{tc}$ and intercept $T_{O.tc}$ to the functional model. At the same time, the mechanism model reads the torque ratio from characteristic data, and gives it to the functional model.

FIG. 10 is a block diagram of the functional model of the torque converter.

<Vehicle Driving Force Model>

The vehicle driving force model is constituted by a vehicle mass, travel resistance, tire radius, final reduction ratio, and moment of inertia of an axle shaft. The tire rolling resistance, air resistance, and hill-climbing resistance as factors of the travel resistance are extracted from the mechanism model, and are converted into a viscous drag coefficient and offset load to be given to the functional model.

Figure 11:
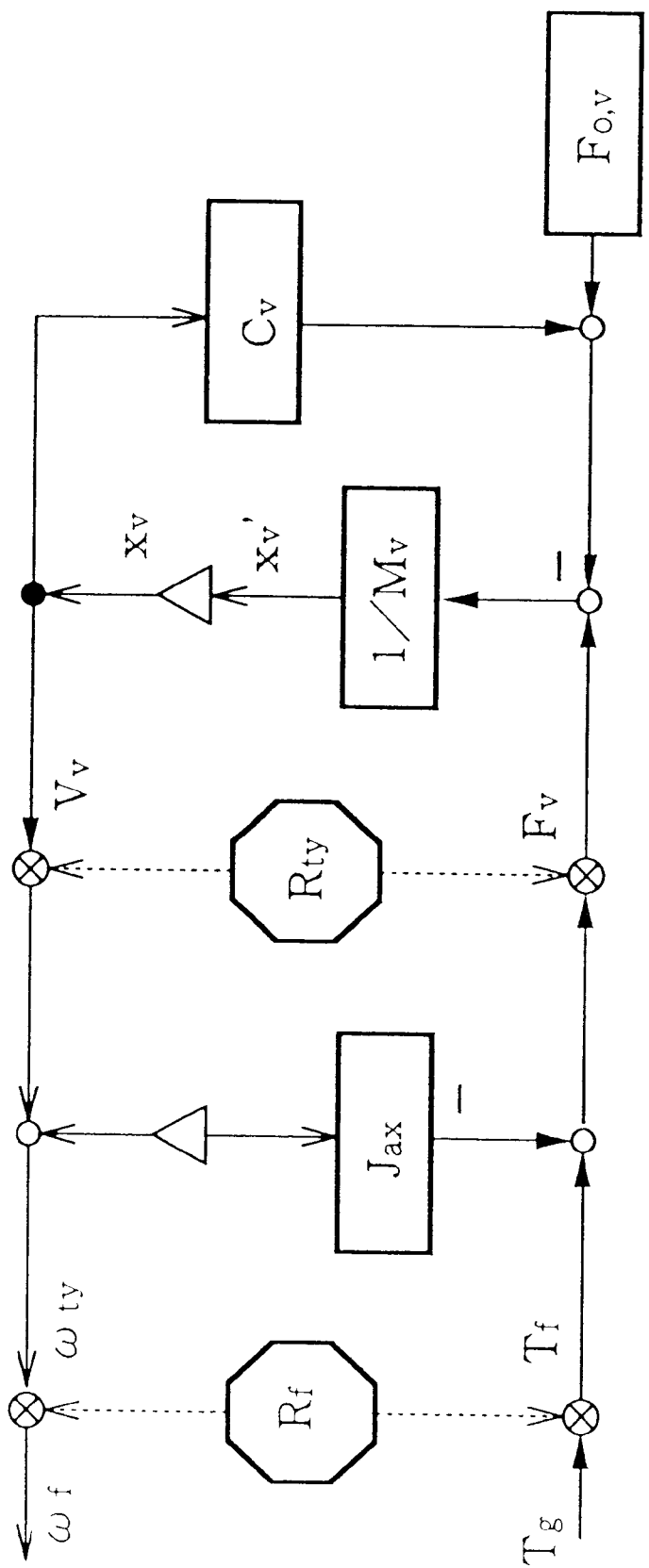
FIG. 11 is a diagram for explaining a functional model of the torque converter shown in FIG. 10.

Referring to FIG. 11, $R_f$ is the final reduction gear ratio of the gear box, $J_{ax}$ is the inertial mass of the shaft, $R_{ty}$ is the radius of the tire, $M_v$ is the mass of the vehicle, $C_v$ is the viscous drag coefficient that depends on velocity, and $F_{O.v}$ is the offset force acting on the vehicle body.

<Integration of Functional Models>

The power train as an integrated unit of the aforementioned engine, torque converter, and driving force units (including the gear box) can be expressed by integrating their system equations.

Figure 12:
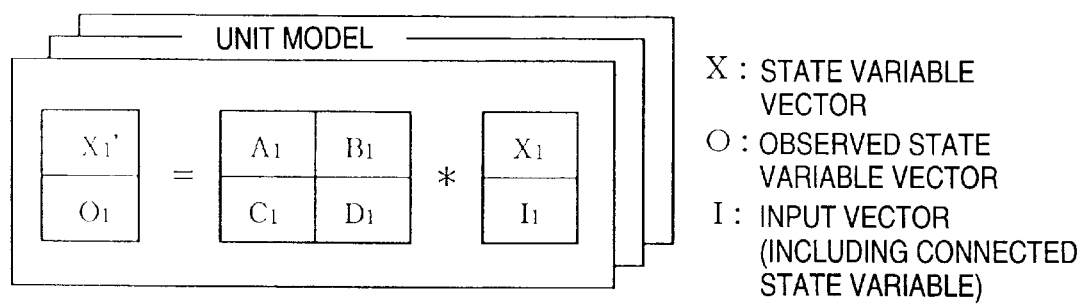
FIG. 12 is a view for explaining integration of system equations of a plurality of units.
Figure 13:
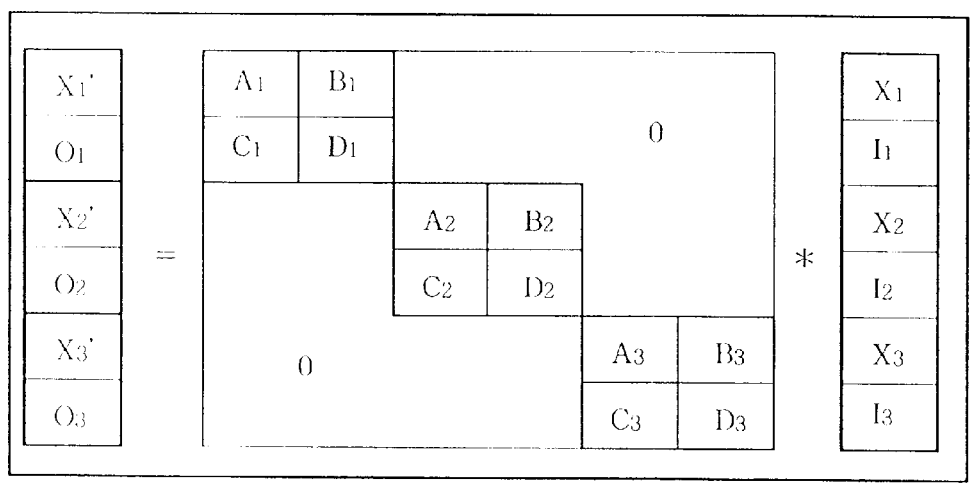
FIG. 13 is a view for explaining integration of system equations of a plurality of units.
Figure 14:
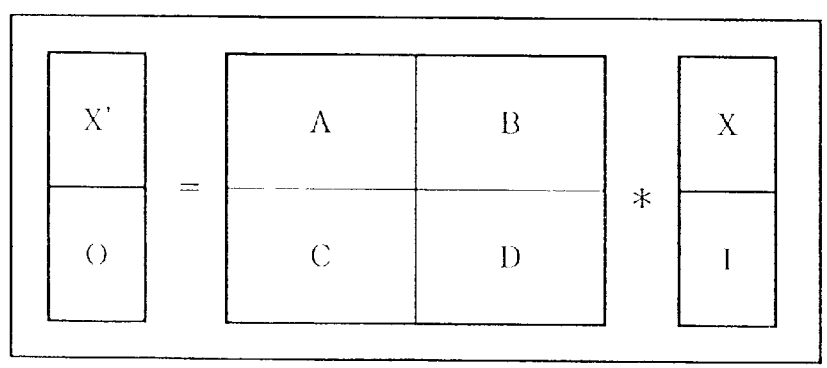
FIG. 14 is a view for explaining integration of system equations of a plurality of units.

FIGS. 12 to 14 are views for explaining integration of system equations. The integration is described in detail in Japanese Patent Application No. 7-250974 filed by the present inventors, and its contents will be quoted in the present specification.

More specifically, assume that there are three unit models to be integrated, as shown in FIG. 12. Then, parameter matrices of the individual units are placed at diagonal positions on a system equation, and input and output vectors are factored into state variables and input and observed state variables by manipulating the rows and columns of the matrix, as shown in FIG. 13.

Figures 15, 16:
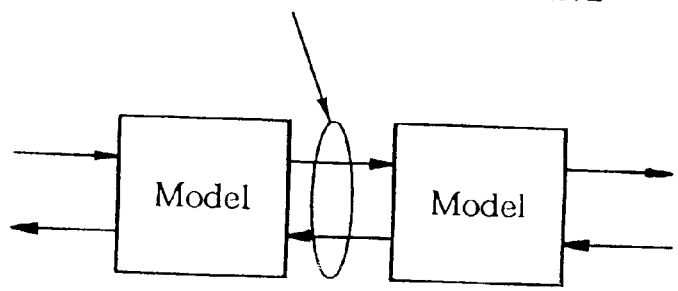
FIG. 15 is a view for explaining deletion of connected state variables upon integration.
FIG. 16 shows a continuous-time system model of system equations of the integrated units.

As shown in FIG. 15, connected state variables (observed state variables) between two units are substituted in input state variables to delete the input state variables as connected state variables from input vectors. With such manipulations, the integrated system is expressed by an equation in the form of FIG. 14. As a result, the input vector I in this equation consists of only a constant term and, hence, is independent from time. In this way, the integrated model is completed.

The input vector I consists of only a constant term since offset amounts and the like are inserted in partial matrices A, B, and C of the individual unit models.

<Solution>

In order to simulate the integrated model, the integrated system equation must be solved.

In this embodiment, the integrated system equation is calculated in a discrete time system using zero-th-order hold. In a continuous-time system, this state equation is nonlinear, but in a discrete time system with a short unit time, the input I is expressed as a step input, i.e., the input I has a constant value within a short time $\Delta t$ and, hence, it has zero-th order in terms of time. If conversion from the continuous-time system into the discrete-time system is done for a partial matrix [A B] to obtain a converted matrix [P Q], P and Q are, as shown in FIGS. 17 and 18, given by:

$$P = \exp(A \cdot t_s) = E + A \cdot t_s + \frac{A^2 \cdot t_s^2}{2!} + \cdots + \frac{A^n \cdot t_s^n}{n!} \quad (EQ\ 8)$$

$$Q = \int_0^{t_s} B \cdot \exp(A\eta)d\eta \quad (EQ\ 9)$$
$$= \left\{E + \frac{A \cdot t_s}{2!} + L + \frac{A^n \cdot t_s^n}{(n+1)!} + L\right\} \cdot B t_s$$

where E is the unit matrix, and $t_S$ is the sampling time. The system equation of the discrete system is given by:

$$[X_{k+1}\ O_k]^T = \begin{bmatrix} P & Q \\ C & D \end{bmatrix} \times [X_k\ I_K]^t \quad (EQ\ 10)$$

<Structurally nonlinear Power Train Functional Model>

A clutch is a typical mechanism element that controls structural nonlinearity for disconnecting or connecting systems. The power train to be simulated by this embodiment is an automatic gear box model having a ravigneaux planetary gear train as an example containing the nonlinear element.

Modeling of a clutch element upon handling such mechanical nonlinear clutch element will be explained below.

<Modeling of Clutch Element>

A clutch model is obtained on the basis of a mechanical impedance that receives a rotation difference between two systems connected thereto, and outputs a torque as a response.

As a mechanical impedance model, two models, i.e., a model that connects systems by rigidity and a model consisting of only a viscous coefficient, are available. Since the latter model is compared to a viscous coupling and is easy to handle although slippage slightly occurs upon engagement, the system of this embodiment as an automatic gear box model adopts the latter model consisting of only a viscous coefficient.

When the torque to be transmitted has exceeded a torque value that can be transmitted (to be referred to as a torque capacity $T_{Ce}$ hereinafter), the clutch begins to slip, and outputs a torque equal to the torque capacity $T_{Ce}$.

Figure 19:
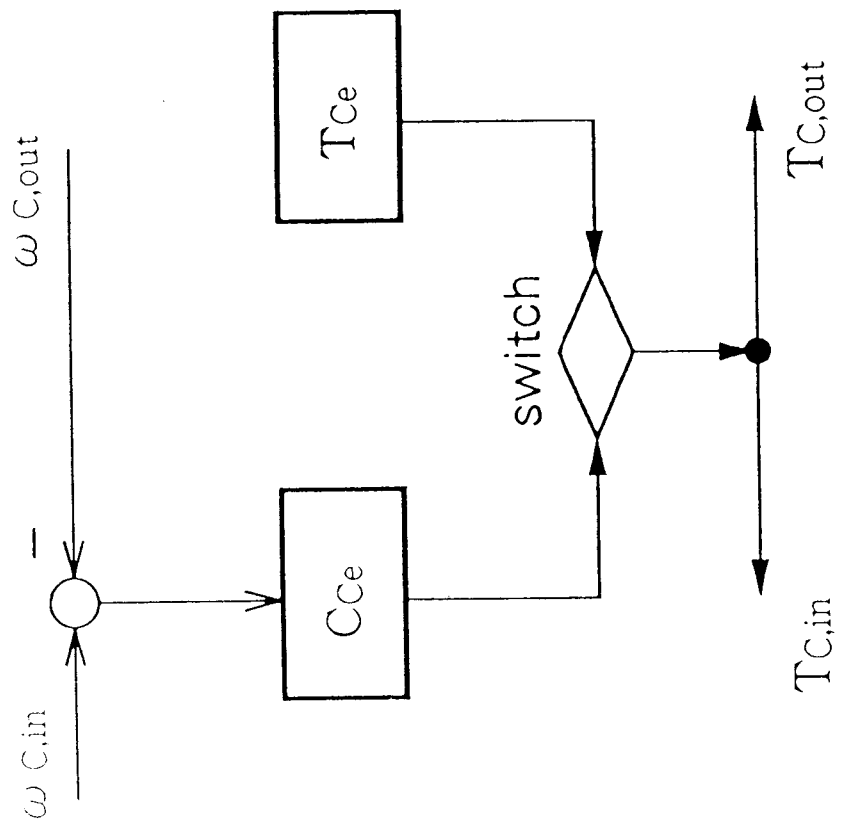
FIG. 19 is a diagram showing a model of a clutch to which the virtual concept is applied.

FIG. 19 shows the functional model of the clutch. The torque capacity $T_{Ce}$ is given to the functional module by a clutch mechanism model. As shown in FIG. 19, the functional model calculates the torque value in an engaged state. More specifically, the rotational speed difference ($=\omega_{C.in}-\omega_{C.out}$) between the input and output is converted into a torque value $T_{in}$ by a coefficient $C_{Ce}$, and the torque value is compared with the capacity $T_{Ce}$. If $T_{in} > T_{Ce}$, $T_{Ce}$ is output; if $T_{in} < T_{Ce}$, T is output. More specifically, one with a smaller absolute value of $T_{in}$ and $T_{Ce}$ is selected.

A logic operation for selecting an output with a smaller absolute value is expressed by "switch", as shown in FIG. 19. In order to reflect the logic operation result, in a system equation (to be described later) of the clutch, a switch coefficient $S_E$ which is set at "1" upon engagement or "0" upon slippage, and a switch coefficient $S_S$ which assumes a value opposite to the coefficient $S_E$ are set. A parameter of the mechanical impedance portion is multiplied by the former ($S_E$), the torque capacity $T_{Ce}$ is multiplied by the latter ($S_S$), and the sum of these products is output. The respective elements of the system equation of the clutch are:

$$X_C = 0 \quad \text{(EQ 11)}$$
$$O_C = [\, T_{C.in} \quad T_{C.out} \,]^T$$
$$I_C = [\, \omega_{C.in} \quad \omega_{C.out} \quad 1 \,]^T$$

$$A_C = B_C = C_C = 0 \quad \text{(EQ 12)}$$
$$D_C = \begin{bmatrix} S_E C_{Ce} & -S_E C_{Ce} & S_S T_{Ce} \\ S_E C_{Ce} & -S_E C_{Ce} & S_S T_{Ce} \end{bmatrix}$$

For, upon engagement,
$S_E = 1$
$S_S = 0$
upon slippage,
$S_E = 0$
$S_S = 1$
Note that a brake is handled as a clutch, one system of which is at rest.

Figure 20:
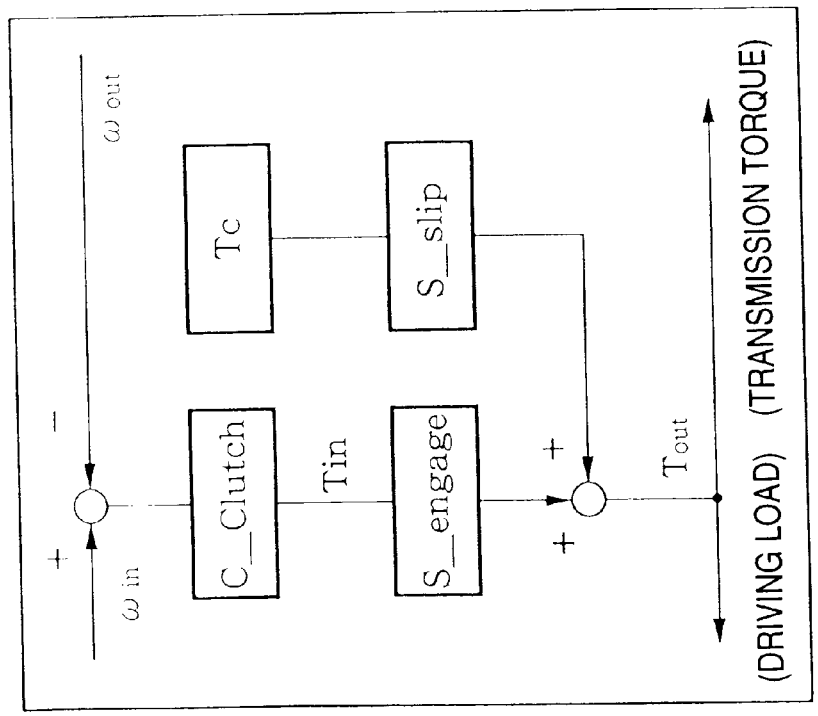
FIG. 20 is a diagram showing a model of a clutch/brake to which the virtual concept is applied.

More specifically, FIG. 20 is a block diagram of the functional model of the clutch (brake) as the viscous coupling. Referring to FIG. 20, $C_{-clutch}$ is equivalent to $C_{Ce}$ in FIG. 19. Two switches $S_{-engage}$ and $S_{-slip}$ are respectively given by:

$|T_{in}| \leq |T_C| \rightarrow S_{-engage} = 1, S_{-slip} = 0$ $|T_{in}| > |T_C| \rightarrow S_{-engage} = 0, S_{-slip} = 1$ <Functional Model of Automatic Gear Box>

The automatic gear box includes a plurality of clutches and brakes. The virtual prototype can model by placing a plurality of clutch and brake models in the same layout as the flow of power of the entity.

Figure 21:
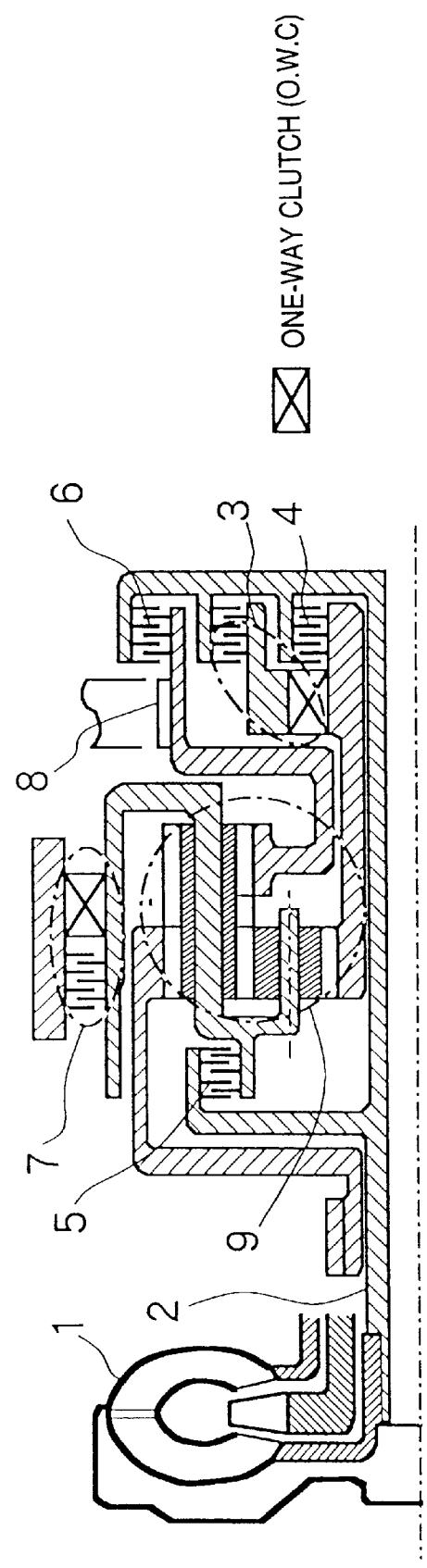
FIG. 21 is a sectional view for explaining the arrangement of an automatic gear box to be simulated.
Figure 23:
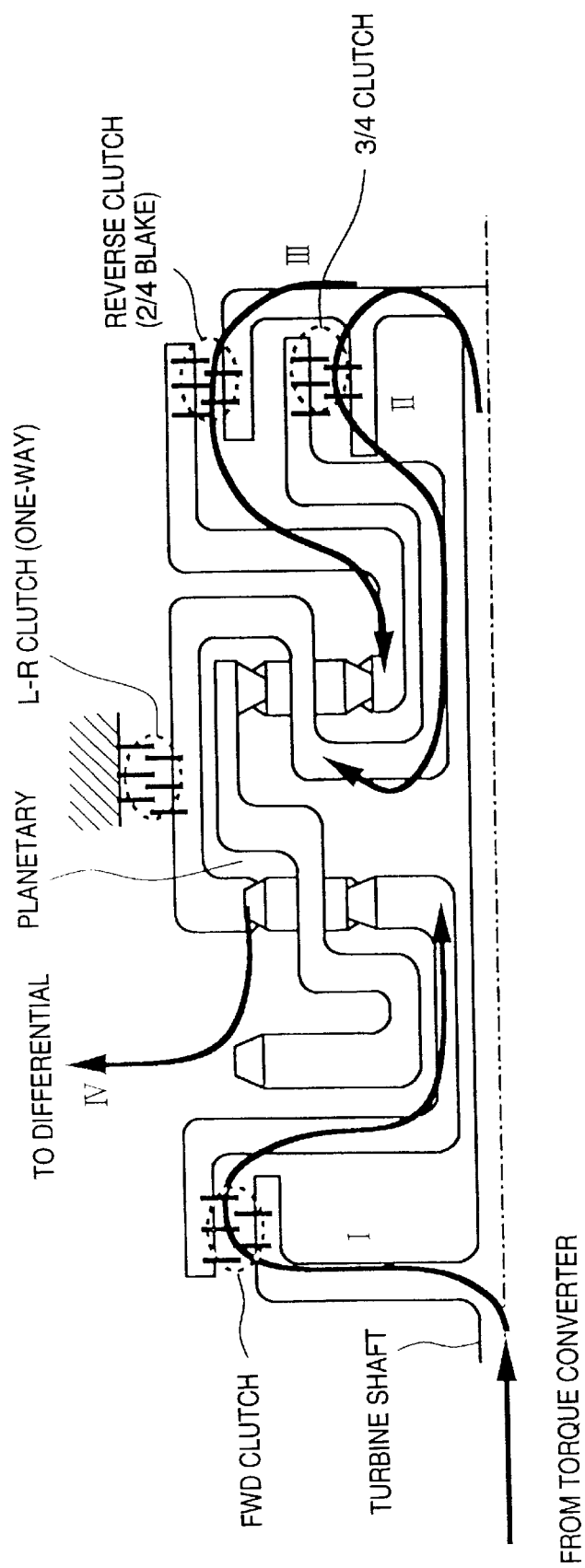
FIG. 23 is a schematic view for explaining the arrangement and torque transmission in the automatic gear box shown in FIG. 21.

FIG. 21 shows the arrangement of the automatic gear box to be modeled by this embodiment. Referring to FIG. 21, reference numeral 1 denotes a torque converter; 2, a turbine shaft; 3, a forward (FWD) clutch; 4, a coaster clutch; 5, a 3–4 clutch; 6, a reverse clutch; 7, an L & R brake; 8, a 2–4 brake; and 9, a planetary gear train. FIG. 23 illustrates the power transmission in the automatic gear box shown in FIG. 21.

Referring to FIG. 23, I indicates the flow of power in the order of turbine shaft→FWD clutch→front sun gear, II indicates the flow in the order of turbine shaft→3–4 clutch→rear carrier (together with L & R clutches), III indicates the flow in the order of turbine shaft→reverse clutch→rear sun gear (together with 2/4 band brake), and IV indicates the flow in the order of front carrier→final gear.

Figure 24:
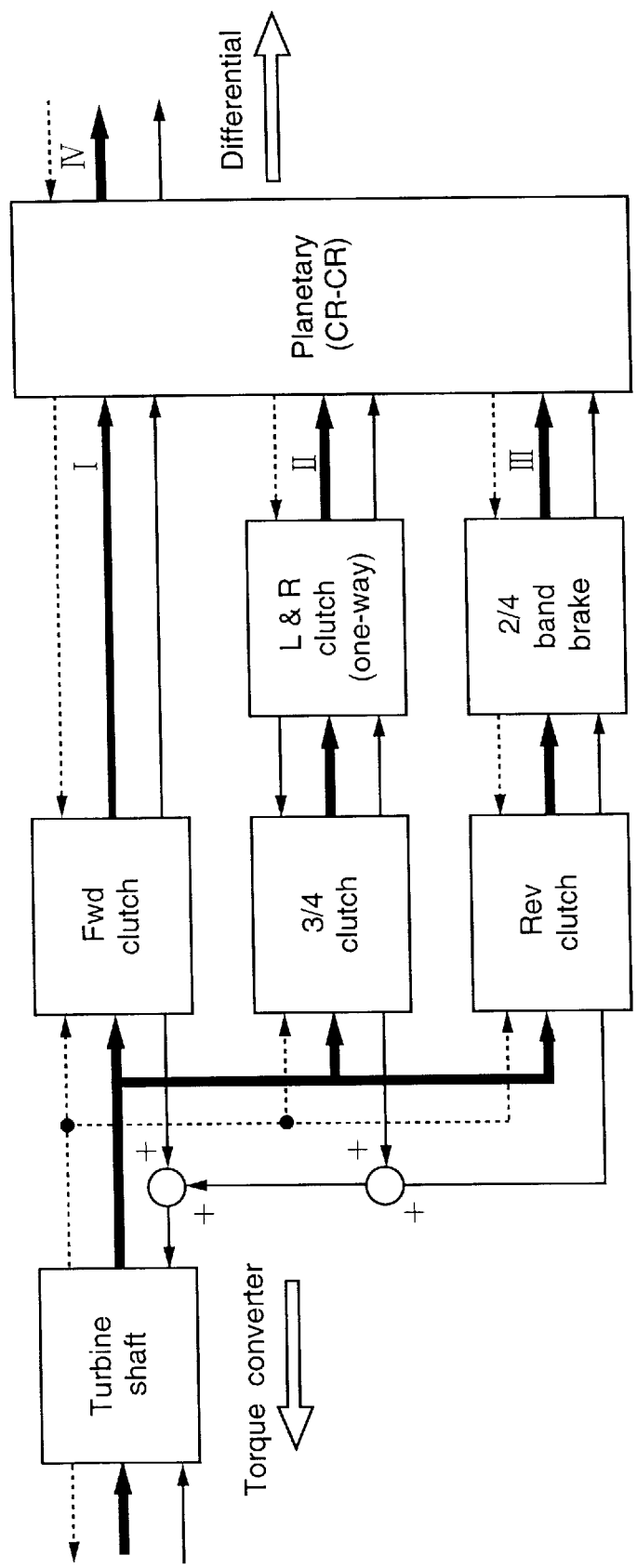
FIG. 24 is a block diagram for explaining the arrangement and torque transmission in the automatic gear box shown in FIG. 21.

FIG. 24 is a diagram obtained by directly modeling the connections among the building elements shown in FIG. 23. Referring to FIG. 24, the rectangular symbol indicates a transfer function (mechanical impedance or mobility), the broken arrow indicates the flow of the potential variable (angular velocity), and the solid allow indicates the flow of the flow variable (torque). Note that this diagram is premised on power=torque×angular velocity.

Figure 25:
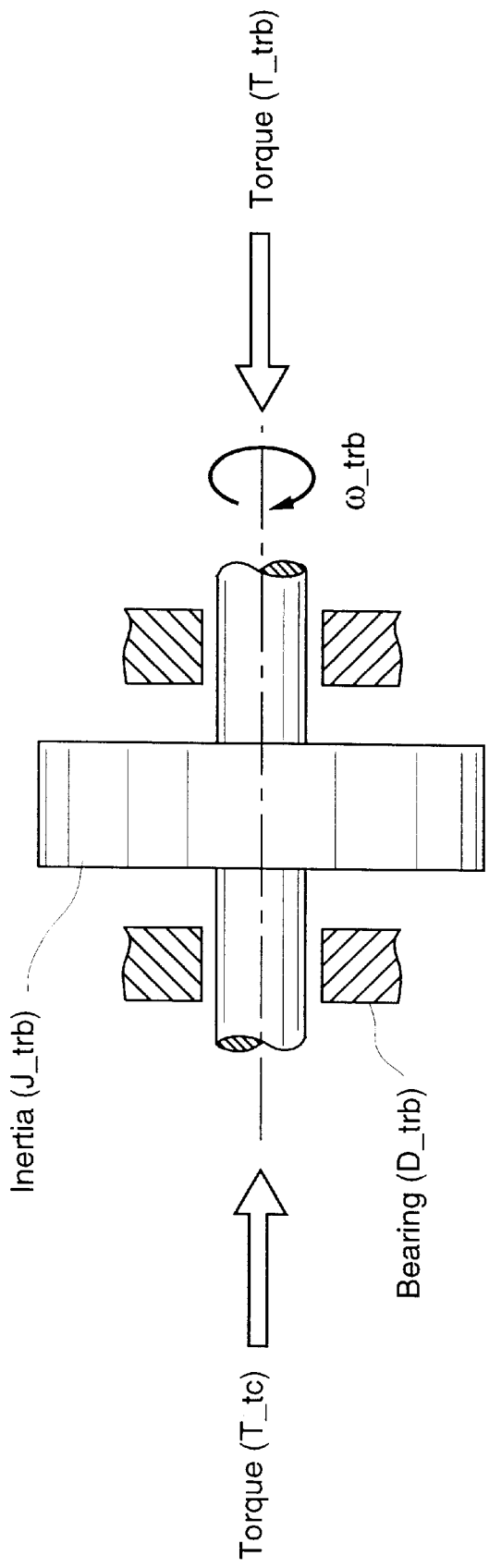
FIG. 25 is a view showing the model concept of a turbine shaft in the automatic gear box shown in FIG. 21.
Figure 26:
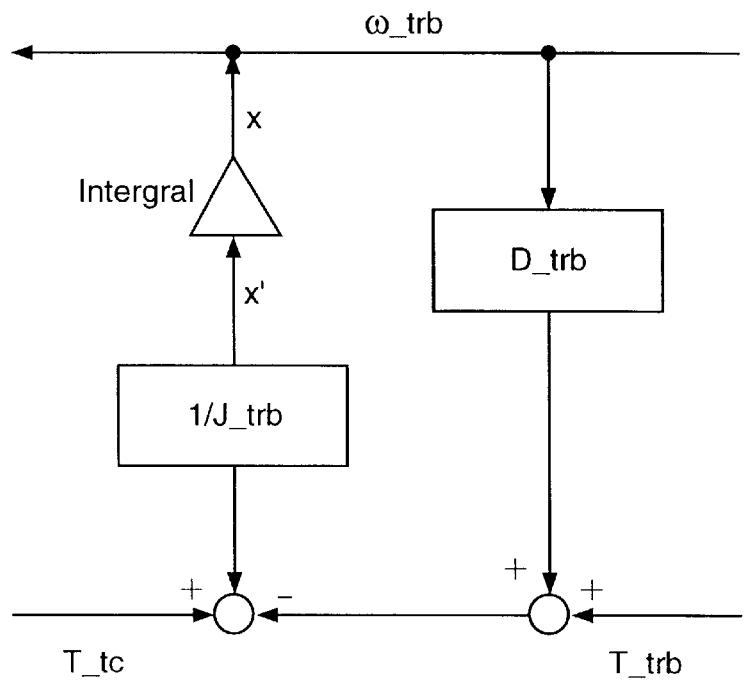
FIG. 26 is a block diagram showing a functional model of the turbine shaft shown in FIG. 25.

The turbine shaft is modeled according to FIG. 25. More specifically, the turbine shaft is handled as a particle system model of a first-order delay system consisting of an inertia (J-trb) and viscous drag (D-trb). FIG. 26 is a block diagram of this model. In FIG. 26, a torque T-tc is a torque input from the torque converter. A state equation of the turbine shaft according to this block diagram is:

$$x' = -\frac{Dtrb}{Jtrb} \cdot x + \frac{Ttc - Ttrk}{Jtrb} \quad \text{(EQ 13)}$$

Figure 27:
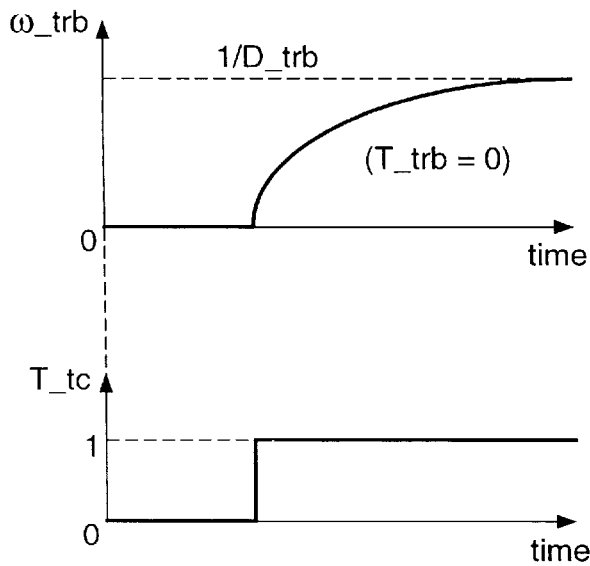
FIG. 27 is a graph showing the response characteristics of the turbine shaft having the function shown in FIG. 26.

FIG. 27 shows the response characteristics of this turbine shaft according to the aforementioned state equation. FIG. 27 shows that the model has first-order response delay characteristics.

Modeling of the FWD clutch, 3–4 clutch, reverse clutch, L & R clutches, and 2–4 band brake will be examined. A general clutch has been explained above with reference to FIG. 19. In the following description, various clutches and brakes unique to the automatic gear box will be examined.

Initially, the coaster clutch that is not directly associated with transmission can be excluded from objects to be modeled.

Figure 28:
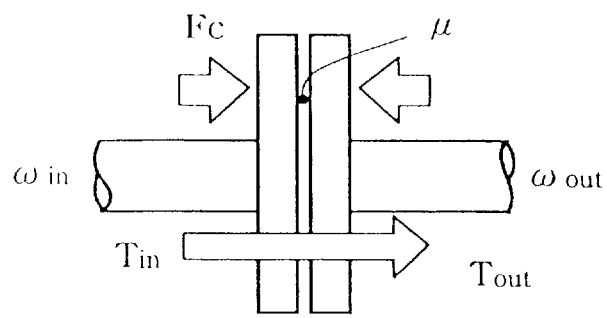
FIG. 28 is a view for explaining a functional model of a clutch to which the virtual concept is applied.

FIG. 28 shows the functional model of a clutch. Referring to FIG. 28, $\mu$ is a coefficient of friction, $R_E$ is the effective diameter of the clutch, $T_C$ is the torque capacity, and FC is the pressing force. Hence, the torque capacity $T_C$ is given by:

$$T_C = \mu \cdot R_E \cdot F_C \quad \text{(EQ14)}$$

The block diagram in FIG. 20 is assigned to the model shown in FIG. 28.

Figure 29:
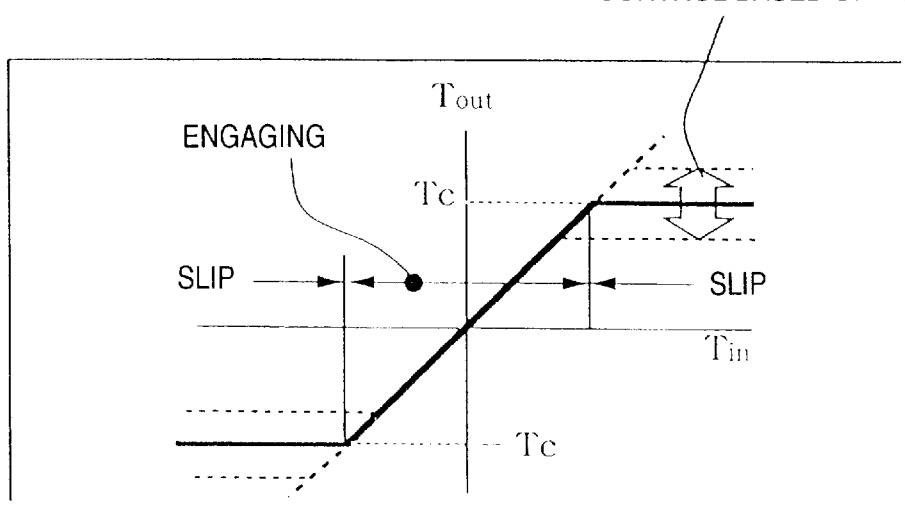
FIG. 29 is a graph for explaining the characteristics of the clutch model shown in FIG. 28.

In a one-way clutch, the engaged and non-engaged states are switched in correspondence with the rotational direction. This operation can be interpreted that the torque capacity $T_{Ce}$ assures zero or a value large enough to ensure engagement in correspondence with the rotational direction. That is, $$T_C = 0:$$

when rotational direction=forward direction, $$T_C = T_o \text{ (for } T_0 >> 1\text{):}$$

when rotational direction=reverse direction. Hence, when the torque capacity that considers layout and operation of a frictional clutch and one-way clutch is given, and these clutches are expressed by a single model, the characteristics shown in FIG. 29 are obtained.

In this gear box, the FWD clutch and one-way clutch (OWC) are laid out in series with each other. In this series layout, if either the FWD clutch or one-way clutch is not engaged, slippage occurs. More specifically, a clutch having a torque capacity with a smaller absolute value is selected. In other words, the FWD clutch and one-way clutch (OWC) can be replaced by a single clutch model, which selects a clutch having a torque capacity with a smaller absolute value.

On the other hand, the L & R brakes select a brake having a torque capacity with a larger absolute value since only one brake can be engaged due to parallel layout.

The mechanism model obtains the torque capacity from the corresponding clutch/brake hydraulic pressure according to the operation of the control system of the automatic gear box, and gives it to the functional model.

This portion uses an existing simulation program. The viscous coefficient values such as $C_{Ce,P}$ and the like which functions in an engaged state are set in consideration of slippage upon engagement and spike-like torque generation at the instance of engagement.

<Functional Model of Planetary Gear Train>

The automatic gear box of this power train is designed to have a planetary gear box. In this embodiment, the functional model of a ravigneaux planetary gear train is proposed as the planetary gear train.

Figure 30:
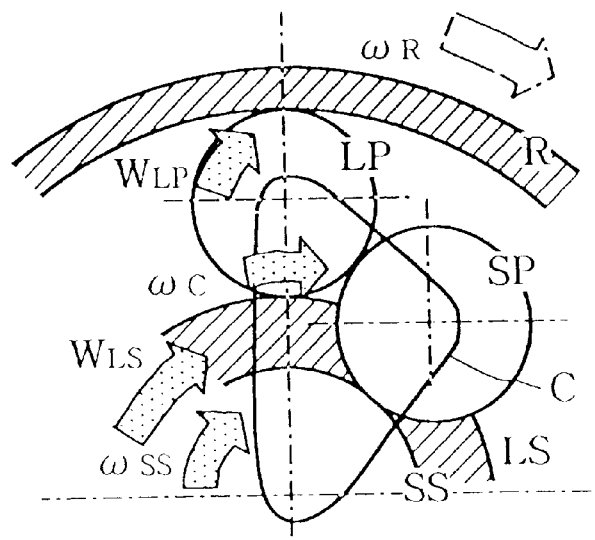
FIG. 30 is a view for explaining gear rotations in a ravigneaux planetary gear unit used in the embodiment of the present invention.
Figure 31:
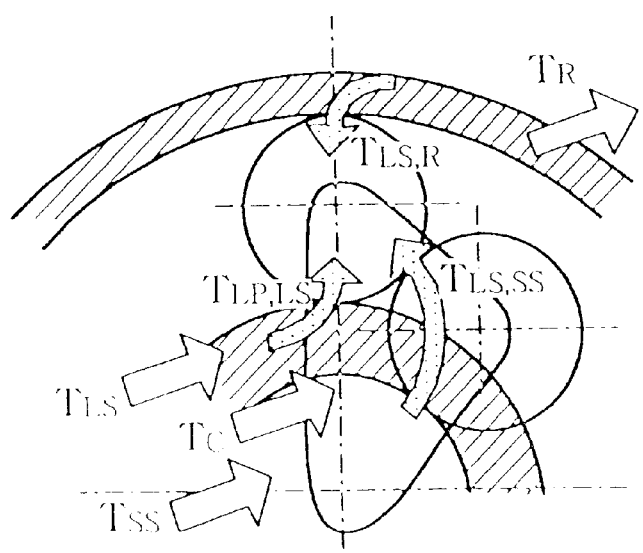
FIG. 31 is a view for explaining torque transmission in the planetary gear unit used in the embodiment of the present invention.

FIGS. 30 and 31 show the ravigneaux planetary gear train respectively in terms of rotation ($\omega$) and torque transmission (T).

This planetary gear train is modeled paying attention to the motion of a long pinion. In this modeling, the rotations of the input and output shafts of the planetary gear train are expressed using:

I: rotation of a ring gear as the output shaft; and
II: rotation of a pinion gear.

With reference to FIG. 30, the rotations of the respective shafts, i.e., a rotational velocity $\omega_{SS}$ of a small sun gear, a rotational velocity $\omega^C$ of a carrier, and a rotational velocity $\omega^{LS}$ LS of an E sun gear are respectively given by:

$$\omega_{SS}=G_{SS}\omega_{LP}+\omega_R$$
$$\omega_C=G_C\omega_{LP}+\omega_R$$
$$\omega_{LS}=G_{LS}\omega_{LP}+\omega_R \quad \text{(EQ15)}$$

where $G_{SS}$, $G_C$, and $G_{LS}$ are the gear ratios between the pinion and the respective shafts on the condition that the ring gear is fixed in position, which include revolution upon rotation of the pinion, and are respectively defined by:

$$G_C = -\frac{z_{LP}}{z_R}, \quad \text{(EQ 16)}$$
$$G_{SS} = \frac{z_{LP}}{z_R}\left(\frac{z_R}{z_{SS}} - 1\right),$$
$$G_{LS} = -\frac{z_{LP}}{z_R}\left(\frac{z_R}{z_{LS}} + 1\right)$$

Torque balance will be examined below with reference to FIG. 31. Let $T_{SS}$, $T_C$, and $T_{LS}$ be the torque components from the respective input shafts to the planetary gear system, and $T_R$ be the output torque. For the sake of simplicity, the inertia and resistance of each shaft are ignored. To balance the entire system, since we have:

$$T_R=T_{SS}+T_C+T_{LS} \quad \text{(EQ17)}$$

the equation of motion around the pinion shaft is:

$$1/J_{LP}\omega'_{LP}+D_{LP}\omega_{LP}=T_{LP\cdot R}+T_{LP\cdot SS}+T_{LP\cdot LS}=G_{SS}T_{SS}+G_CT_C+G_{LS}T_{LS} \quad \text{(EQ18)}$$

where "'" indicates a time differentiation.

Figure 32:
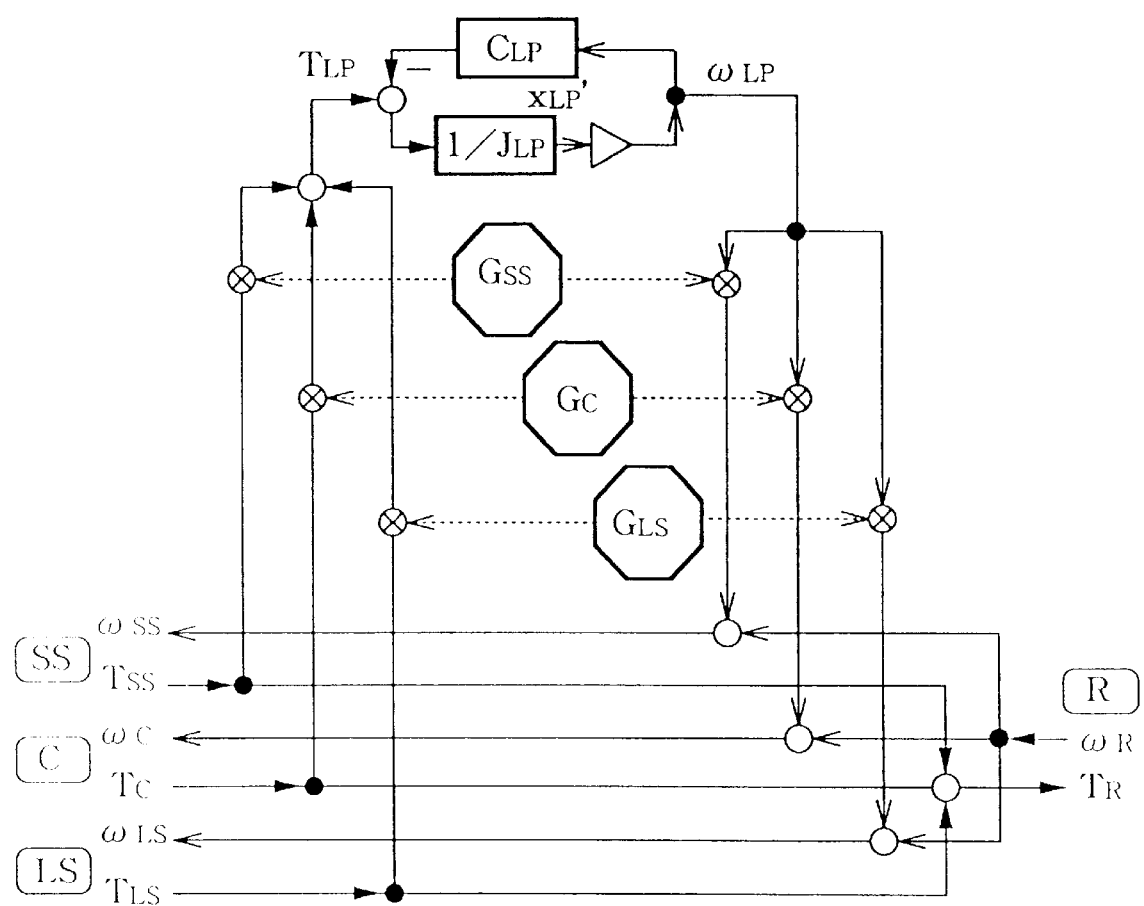
FIG. 32 is a diagram for explaining a functional model of the planetary gear unit.

FIG. 32 is a block diagram of this ravigneaux planetary gear train modeled in this way.

The characteristic feature of the block diagram of FIG. 32 is that a circuit portion that receives/outputs $T_{LP}$ and $\omega_{LP}$ expresses rotation of the long pinion, and other circuit portions express power transmission balance of revolution components. In other words, rotation "interferes with" revolution via the gear ratios. That is, rotation and revolution are expressed in parallel with each other. If rotation and revolution are expressed in series with each other, modeling must be redone every time the conditions and states change. However, since parallel expression is used, the planetary gear train can be expressed by changing only parameters even when the conditions or states change.

The advantage of the parallel expression of the planetary gear train is evident when such expression is applied to gear mechanisms other than the ravigneaux gear train.

A function model when the planetary gear train is a CR—CR planetary gear train will be examined below.

Figure 33:
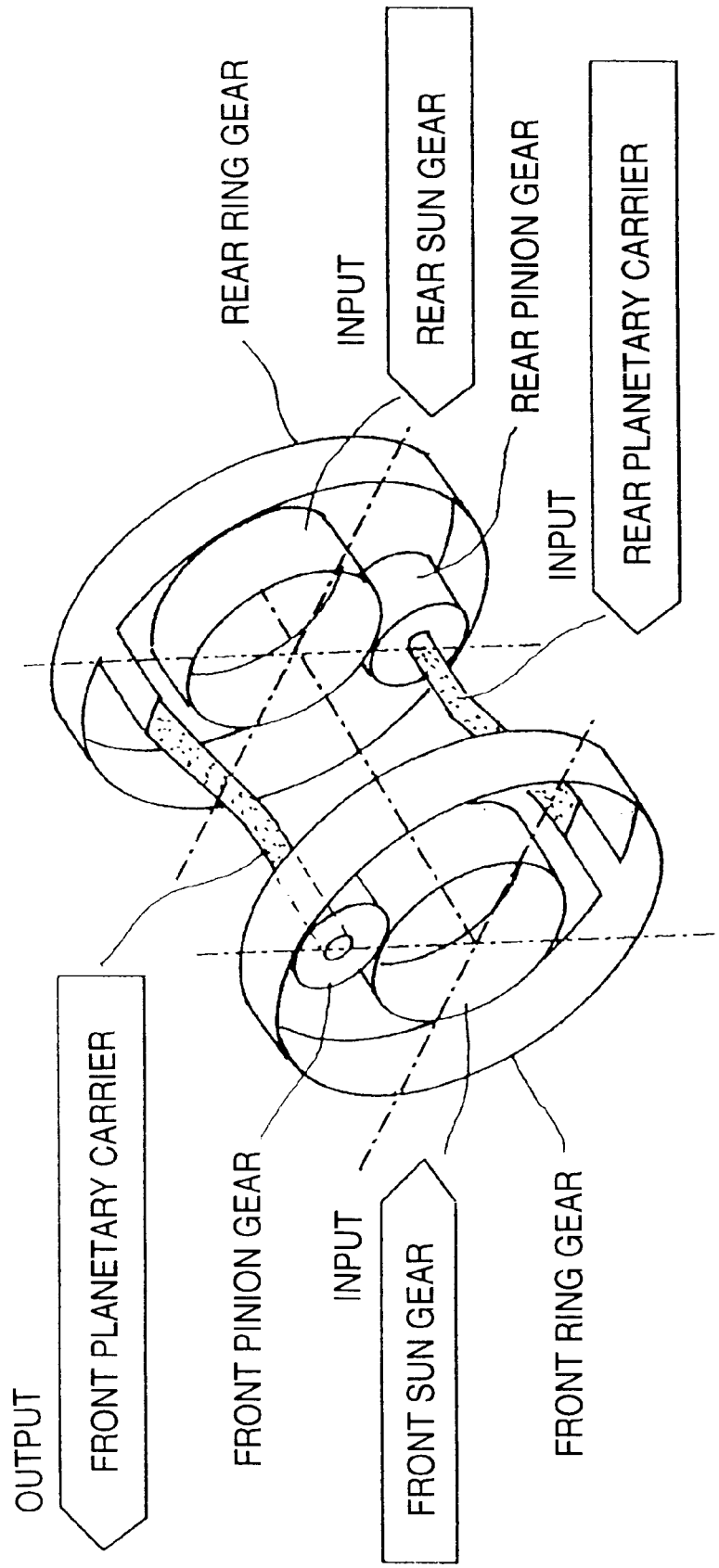
FIG. 33 is a perspective view for explaining the arrangement of a CR—CR planetary gear unit.
Figure 34:
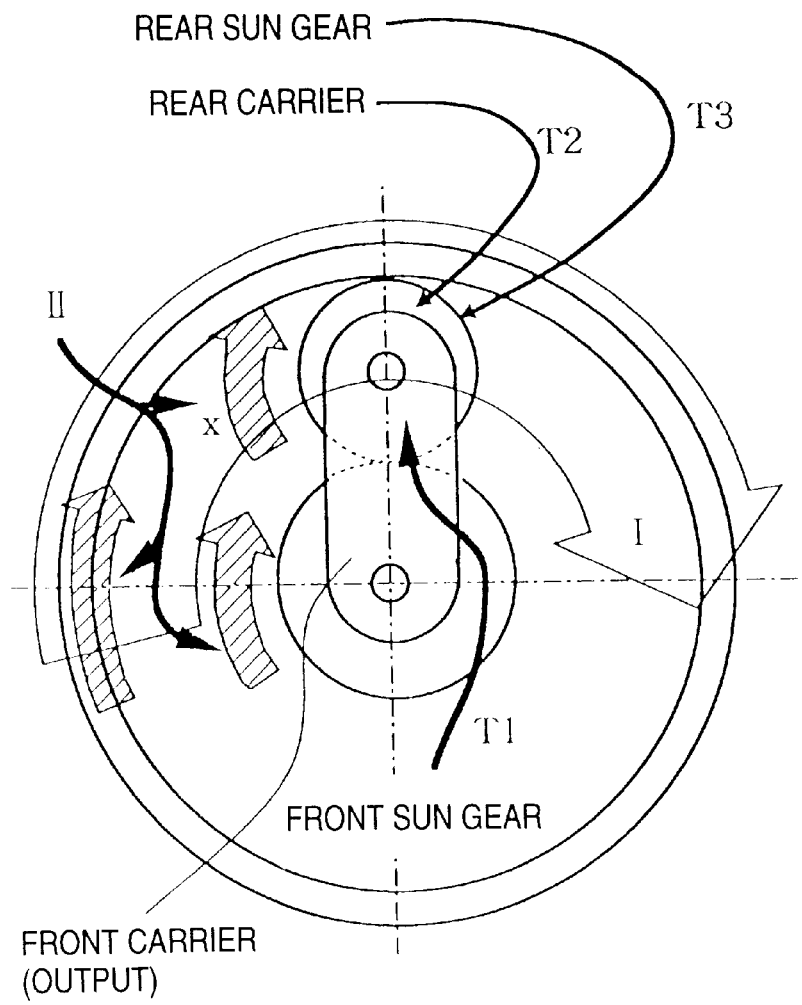
FIG. 34 is a view for explaining the torque flow in the gear unit shown in FIG. 33.

FIG. 33 shows the structure of the CR—CR planetary gear train. This gear train has a pinion gear which revolves around a sun gear between the sun gear and a ring gear. In this CR—CR planetary gear train, a rear ring gear and front pinion gear are coupled via a planetary carrier, and the front pinion gear and a rear pinion gear are coupled via a planetary carrier. FIG. 34 shows the state wherein a pinion gear revolves around a sun gear, and a carrier rotates around a sun gear shaft together with revolution of a pinion gear. The ring gear meshes with the pinion gear.

This planetary gear train is modeled in regard to the motion of the long pinion. This modeling expresses the rotations of the input and output shafts of the planetary gear train by rotations I and II in FIG. 34, i.e.:

I: rotation of the ring gear as the output shaft (i.e., the rotation of the overall system); and
II: rotation of the pinion gear.

Figure 35:
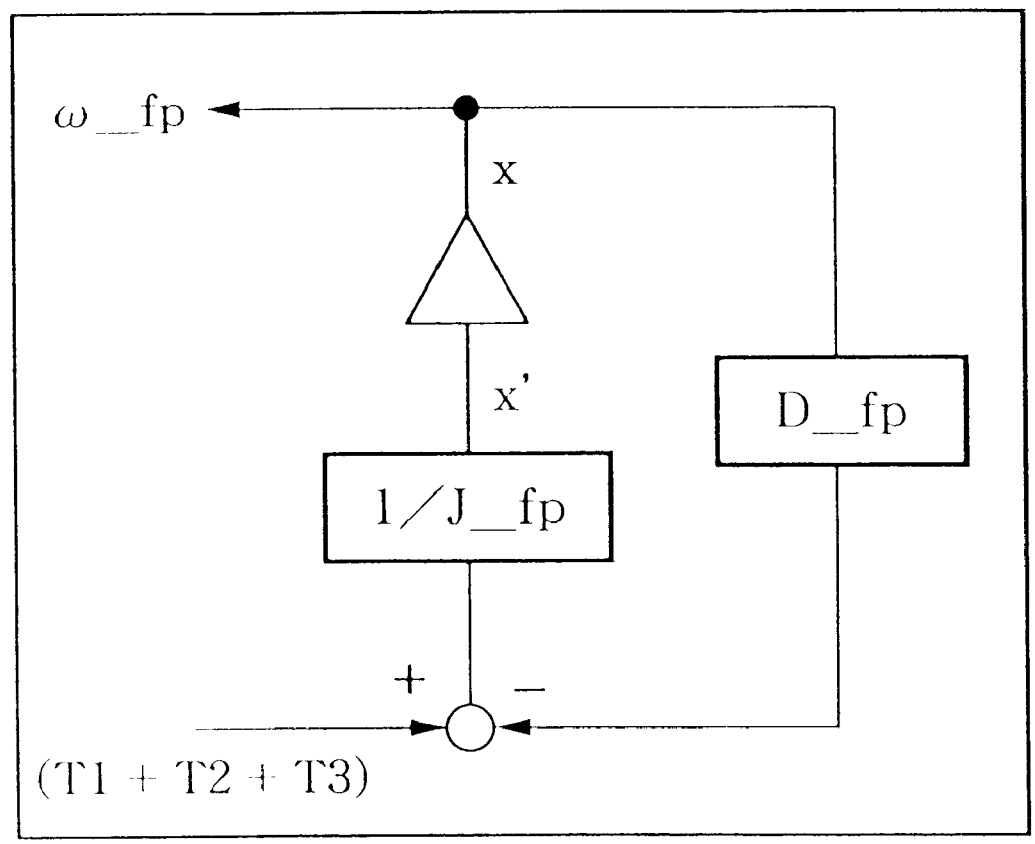
FIG. 35 is a diagram for explaining a functional model of a pinion gear in the gear unit shown in FIG. 33.

In this case, assume that the output shaft (front carrier) is fixed in position. Referring to FIG. 34, let J-fp be the inertia of the front pinion, D-fp be the viscous coefficient of the front pinion, and $\omega$-fp be the angular velocity of the front pinion. Then, the gear train shown in FIG. 34 is modeled, as shown in the block diagram in FIG. 35. Hence, the entire planetary gear train is modeled, as shown in the block diagram of FIG. 36.

Figure 36:
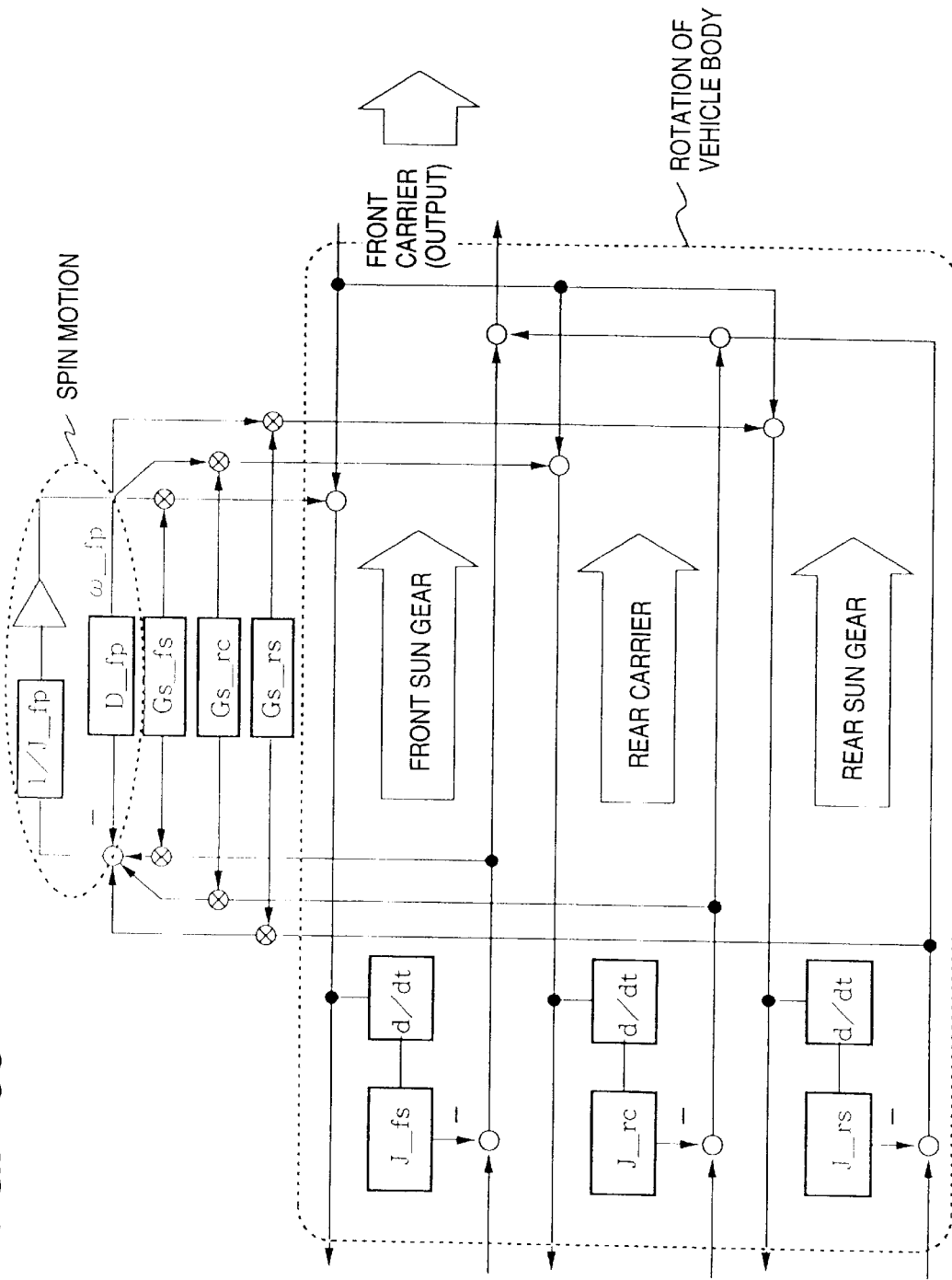
FIG. 36 is a diagram for explaining a functional model of the overall gear unit shown in FIG. 33.
Figure 37:
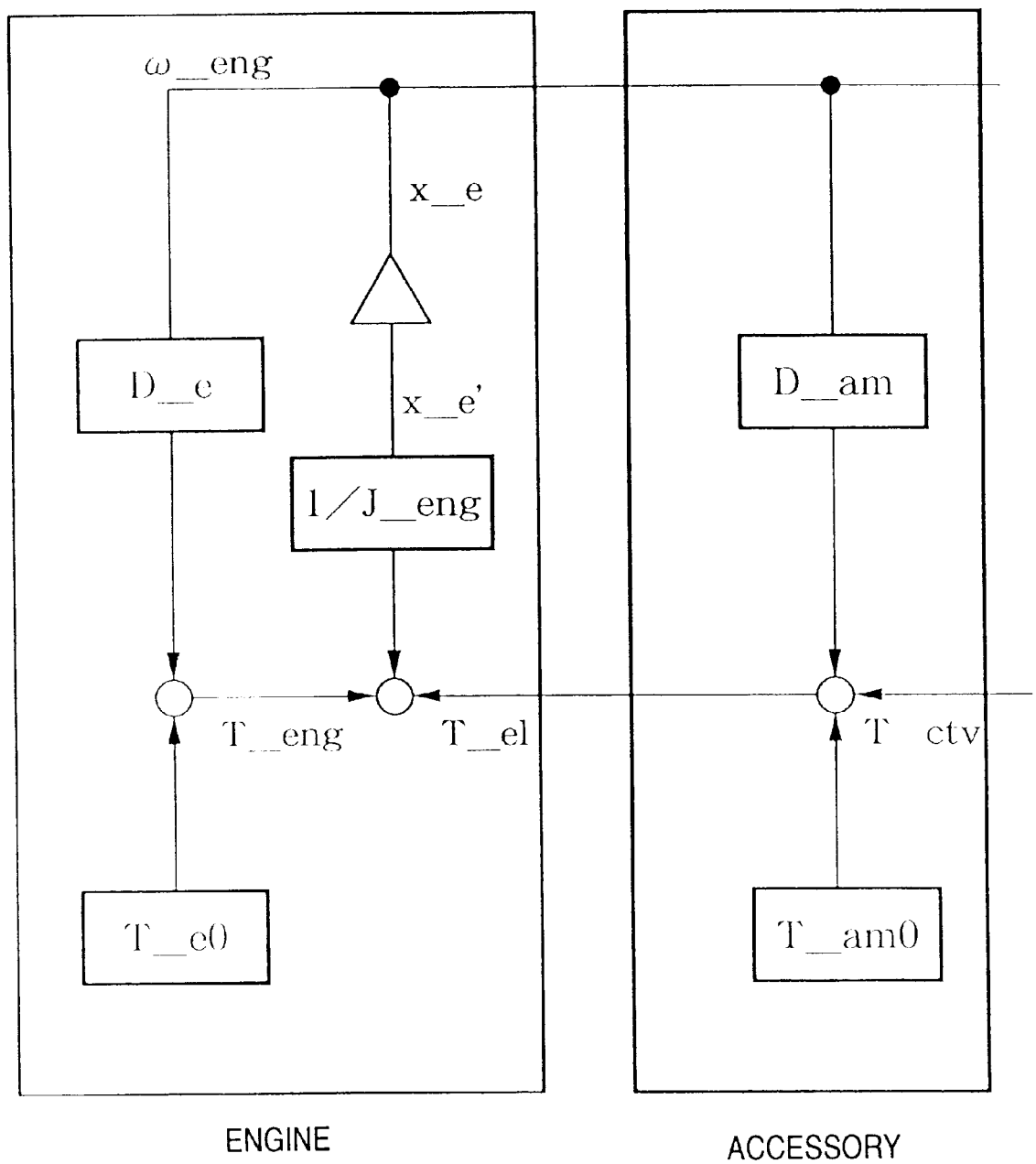
FIG. 37 is a diagram showing a functional model of an engine accessory alone in FIGS. 37 to 42 that show the functional models of the entire power train system shown in FIG. 6.
Figure 38:
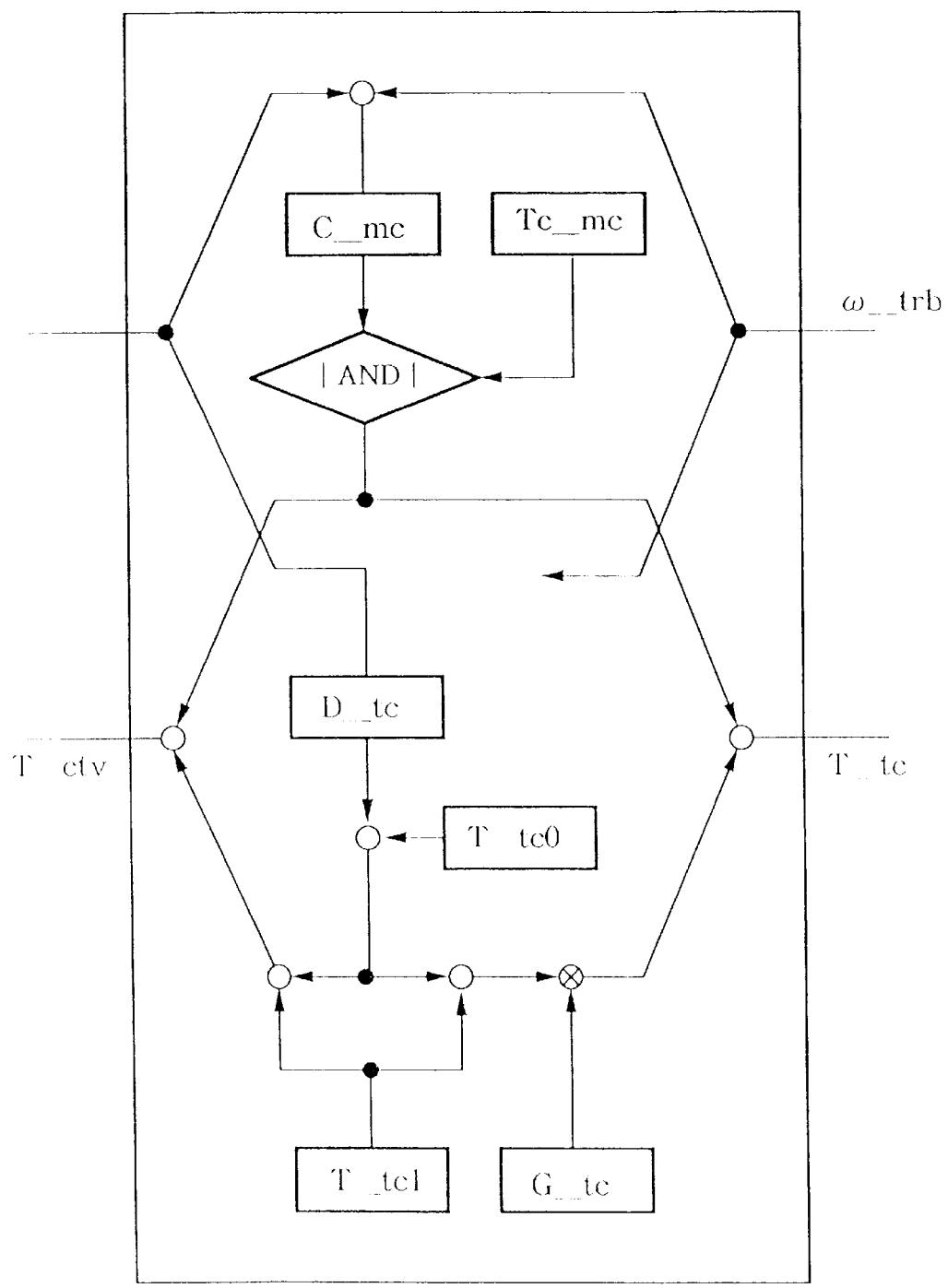
FIG. 38 is a diagram showing a functional model of a torque converter alone in FIGS. 37 to 42 that show the functional models of the entire power train system shown in FIG. 6.
Figure 39:
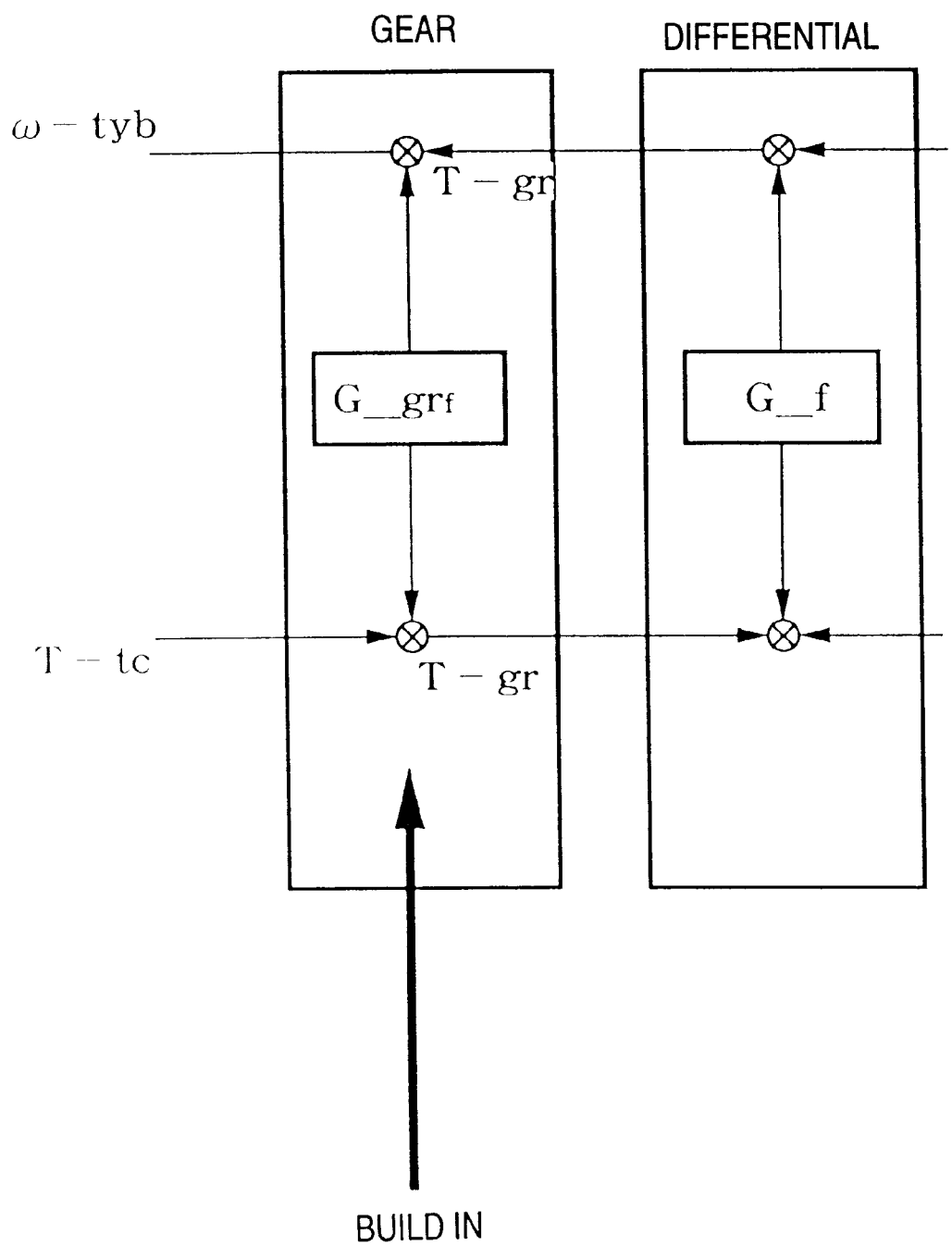
FIG. 39 is a diagram showing a functional model of a gear and differential alone in FIGS. 37 to 42 that show the functional models of the entire power train system shown in FIG. 6.
Figure 40:
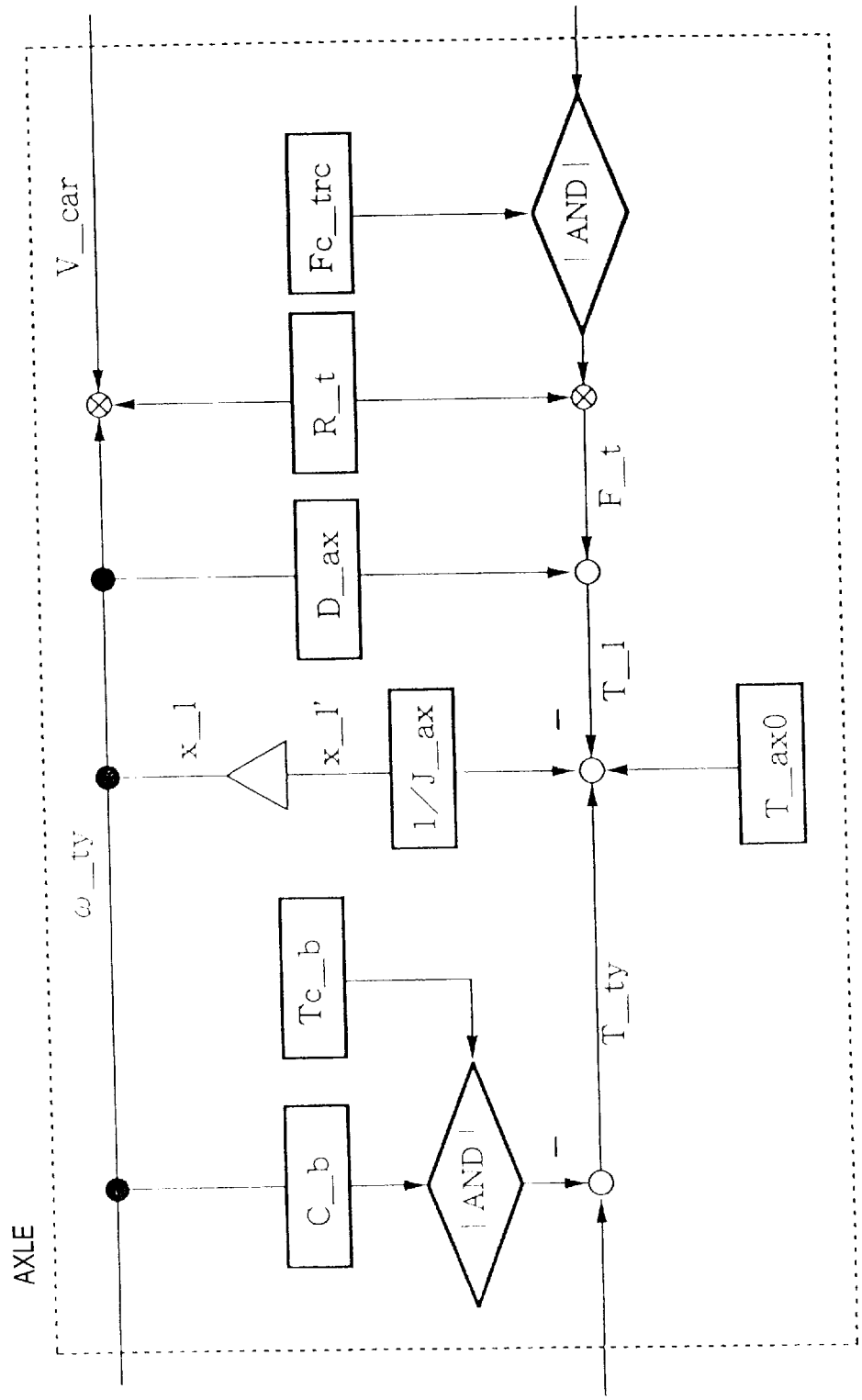
FIG. 40 is a diagram showing a functional model of an axle alone in FIGS. 37 to 42 that show the functional models of the entire power train system shown in FIG. 6.
Figure 41:
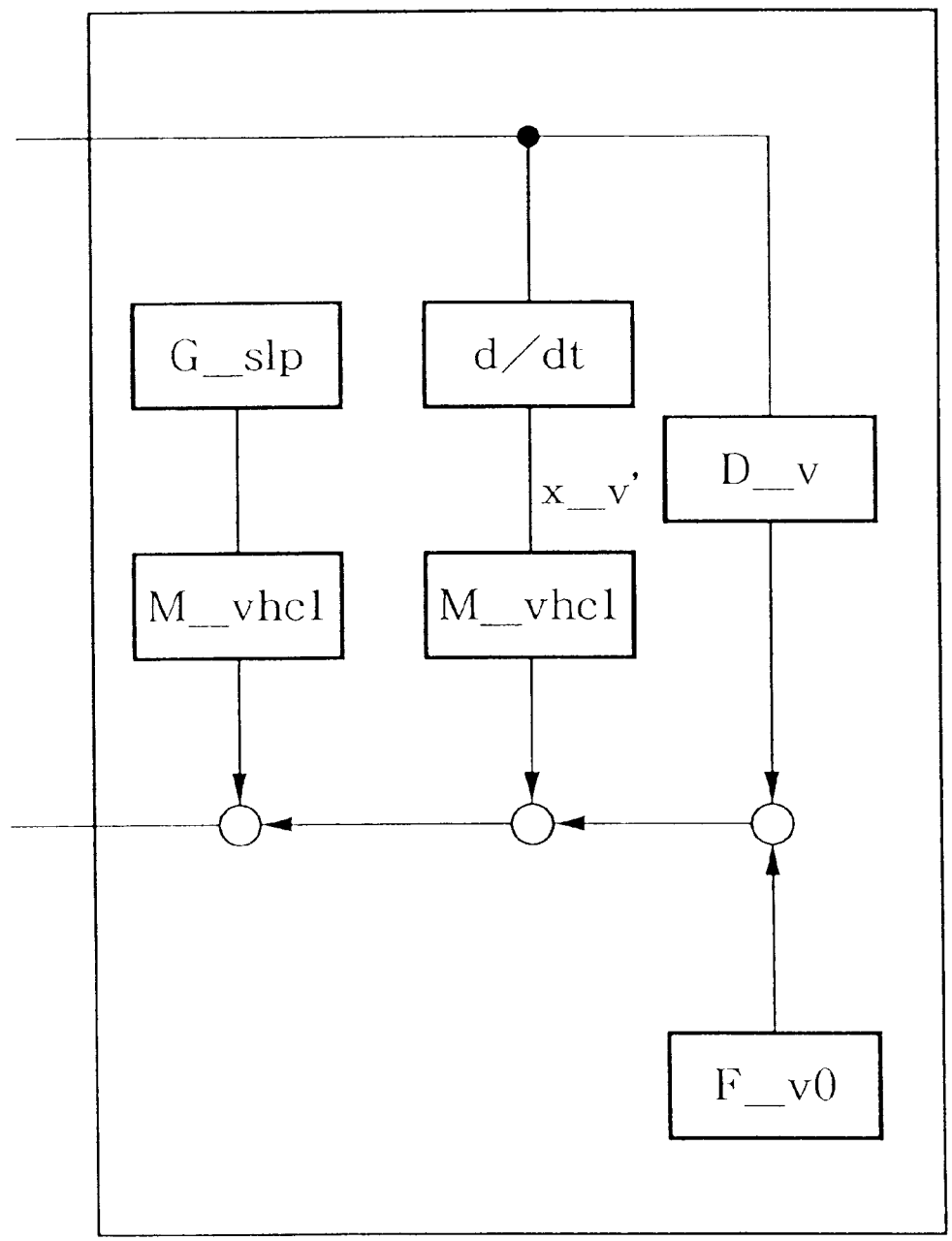
FIG. 41 is a diagram showing a functional model of the travel load alone in FIGS. 37 to 42 that show the functional models of the entire power train system shown in FIG. 6.

As can be seen from the block diagram in FIG. 36, even in the CR—CR gear mechanism, contribution components of rotation of the front pinion gear, and those of revolution of the entire system are parallelly separated.

<Integration to Integrated Model>

The gear box model simply expressed by coupling of only reduction ratios is replaced by an integrated functional model of the gear box mechanism (FIG. 24) and the planetary gear train (FIGS. 30 and 31) to built an integrated model. This integration uses the scheme that has been explained earlier in relation to FIGS. 12 to 15.

Figure 42:
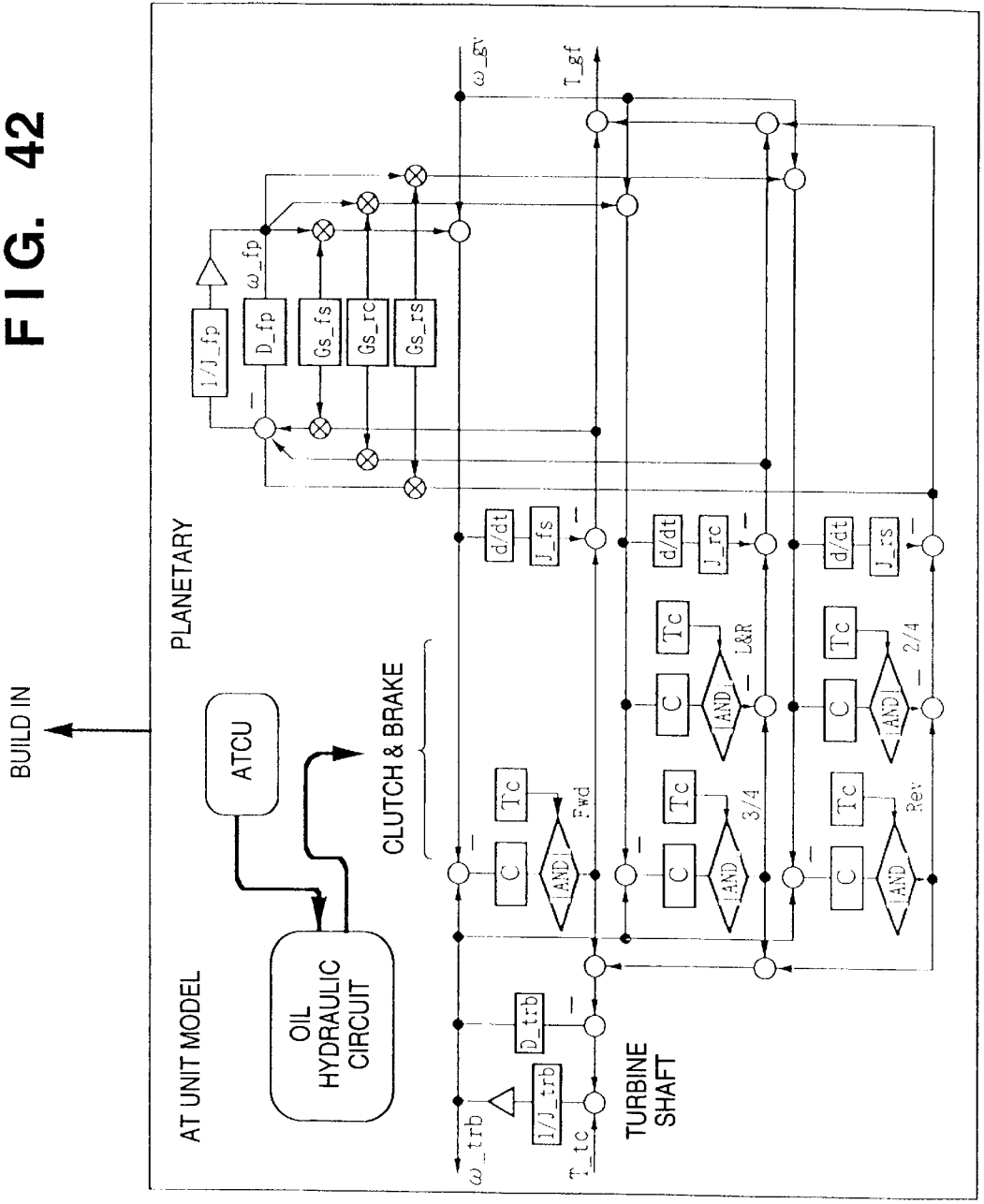
FIG. 42 is a diagram showing a functional model of a planetary gear unit alone in FIGS. 37 to 42 that show the functional models of the entire power train system shown in FIG. 6.

FIGS. 37 to 42 are block diagrams of the entire power train to be simulated, which is applied to the simulation apparatus of this embodiment. Of these drawings, FIGS. 37 to 41 are joined in series with each other, and the block diagram of the planetary gear mechanism shown in FIG. 42 is built in the gear block shown in FIG. 39, thus completing the overall block diagram.

<Simulation Result>

The matrix expression of the integrated model obtained in this way is simulated along the time axis of a discrete system. A simulation sample including nonlinear parameters will be explained.

Figure 43:
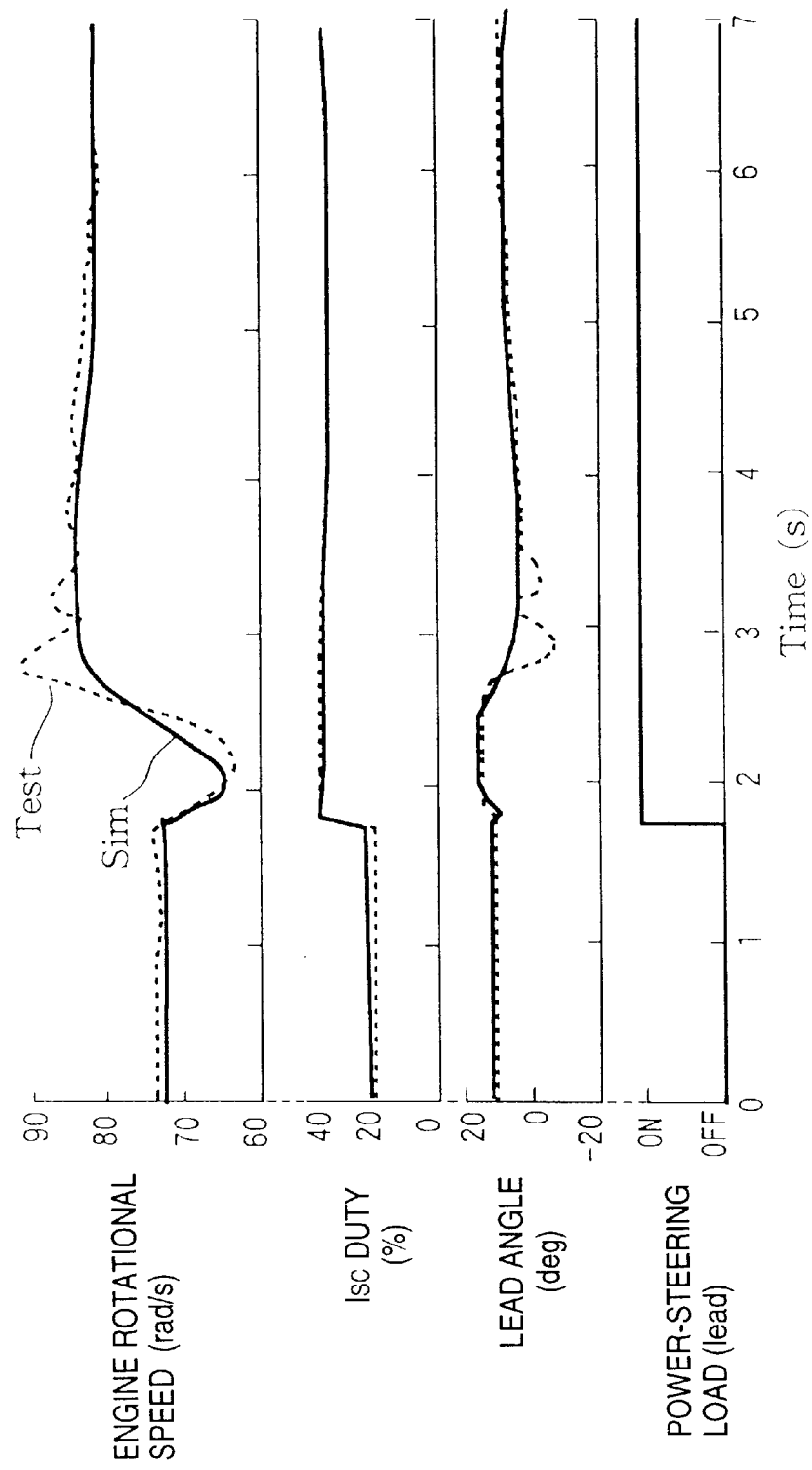
FIG. 43 is a graph showing the simulation results of the power train shown in FIG. 6.

More specifically, FIG. 43 shows the simulation result of variations of engine rotation in response to the load on an engine accessory input to an idling vehicle at a given timing. Upon comparing the simulation result (solid curves) and test results (broken curves) using an actual vehicle in FIG. 43, modeling by the simulation apparatus of this embodiment can provide sufficiently high simulation precision levels when engine rotation and behavior of the engine control system are to be expressed. In the simulation result, rotation recovery is early, and there is no vibration after the rotational speed has risen, unlike the actual vehicle tests. This is because the simulation considers neither instability of combustion nor any vibration system such as an engine mount or the like.

Figure 44:
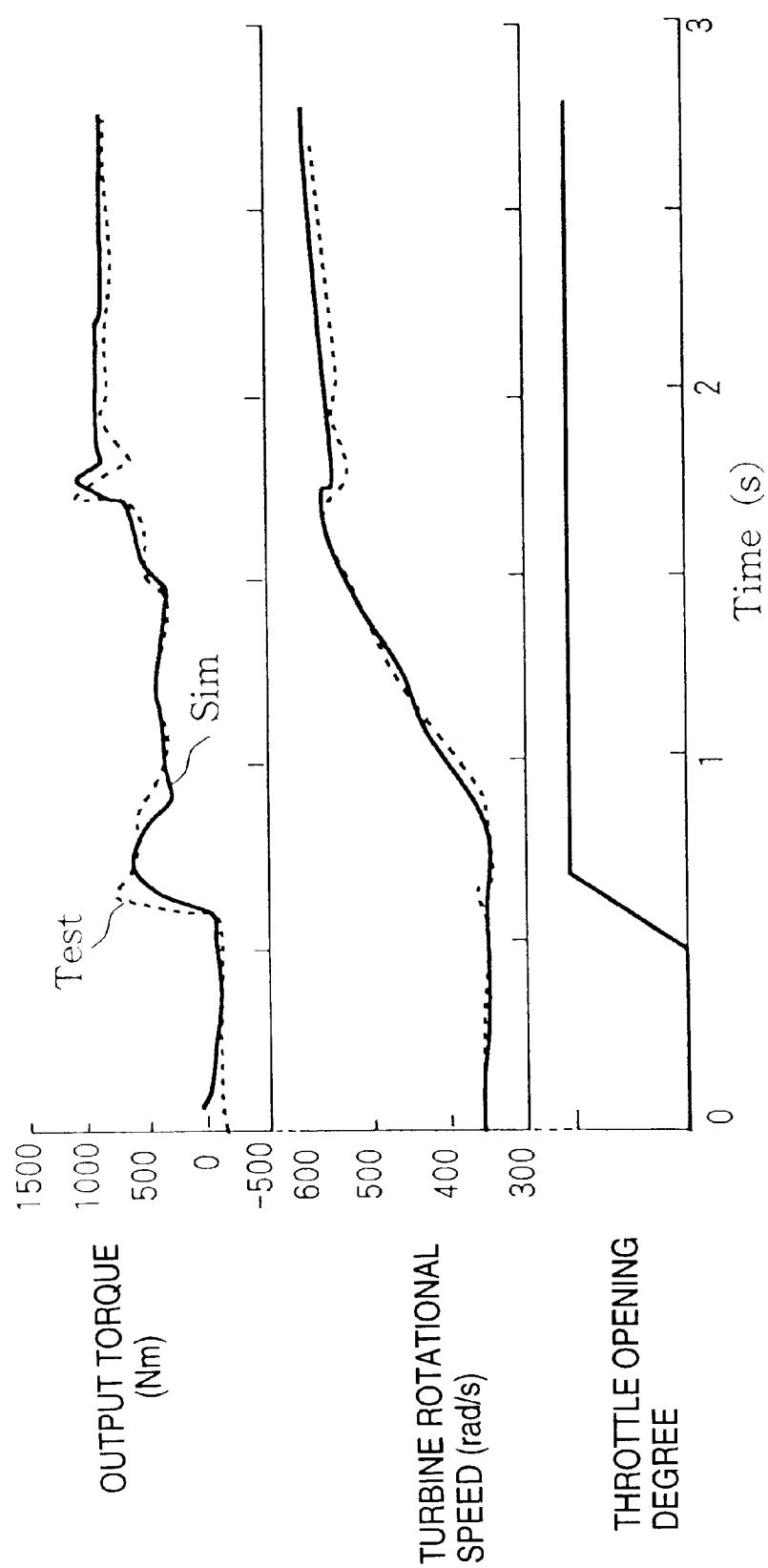
FIG. 44 is a graph showing the simulation results of the power train shown in FIG. 6.

FIG. 44 shows a simulation sample containing structural nonlinearity.

FIG. 44 shows the simulation result of shift changes of the automatic gear box obtained in response to throttle manipulation during travel, using the simulation model shown in FIG. 3. Actually measured values are measurement data obtained by reproducing an identical situation on a test bench. The simulation result well matches the test result of the actual vehicle.

In this way, the engine, automatic gear box, vehicle driving load, and control system, which are modeled individually on the basis of the concept of the virtual prototype are integrated to develop a model of the overall power train. An examination of the model revealed that sufficiently high precision can be obtained, thus proving effectiveness of modeling based on the virtual prototype.

<System Arrangement>

Figure 45:
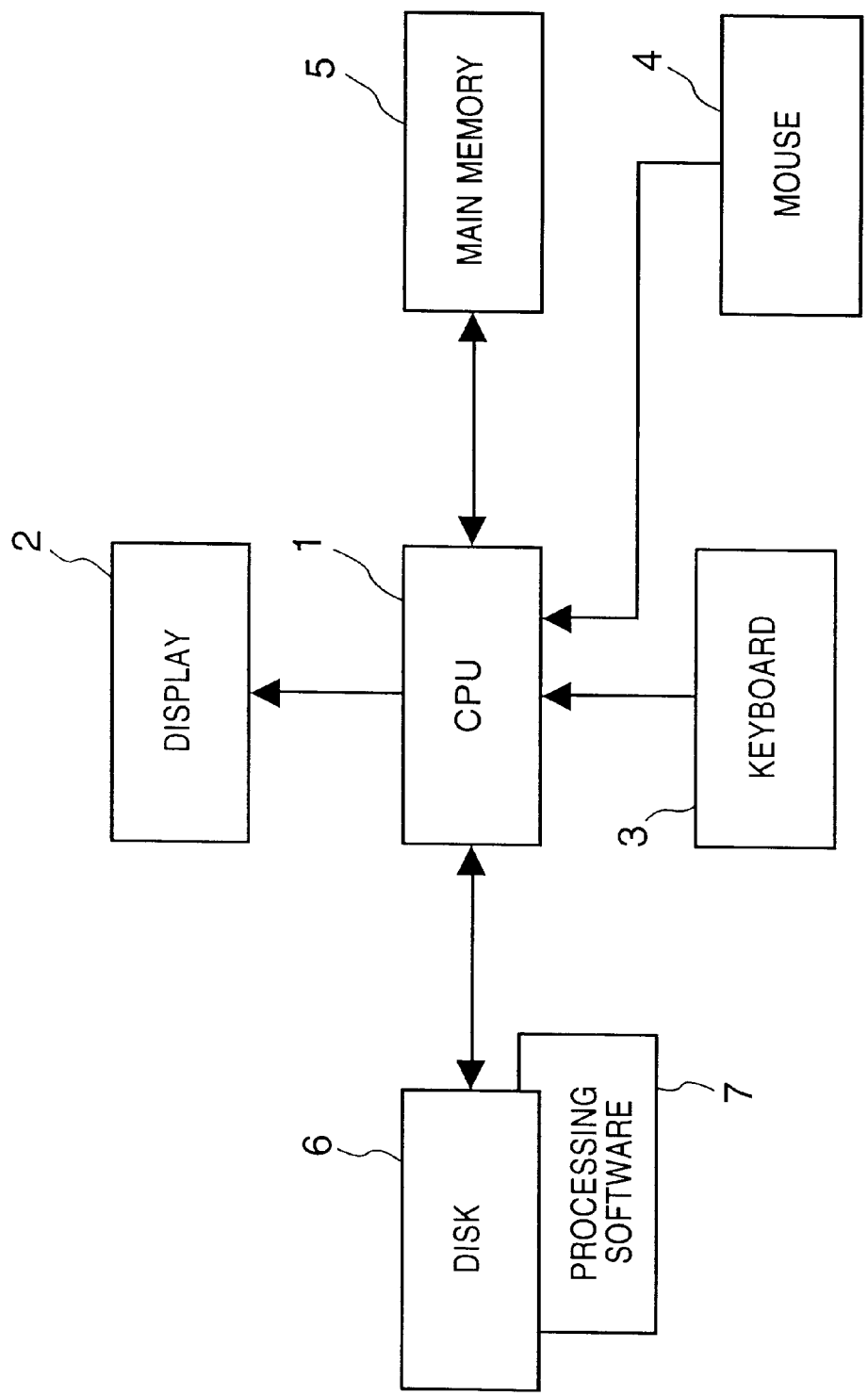
FIG. 45 is a block diagram for explaining the hardware arrangement of a simulation apparatus according to the embodiment of the present invention.

FIG. 45 shows the hardware arrangement of the simulation apparatus according to this embodiment. This hardware comprises a CPU 1, display 2, keyboard 3, mouse 4, main memory 5, file disk 6, and file disk 7 for processing software.

The flows of data and files in the simulation apparatus of FIG. 45 will be explained with reference to FIG. 46.

Figure 46:
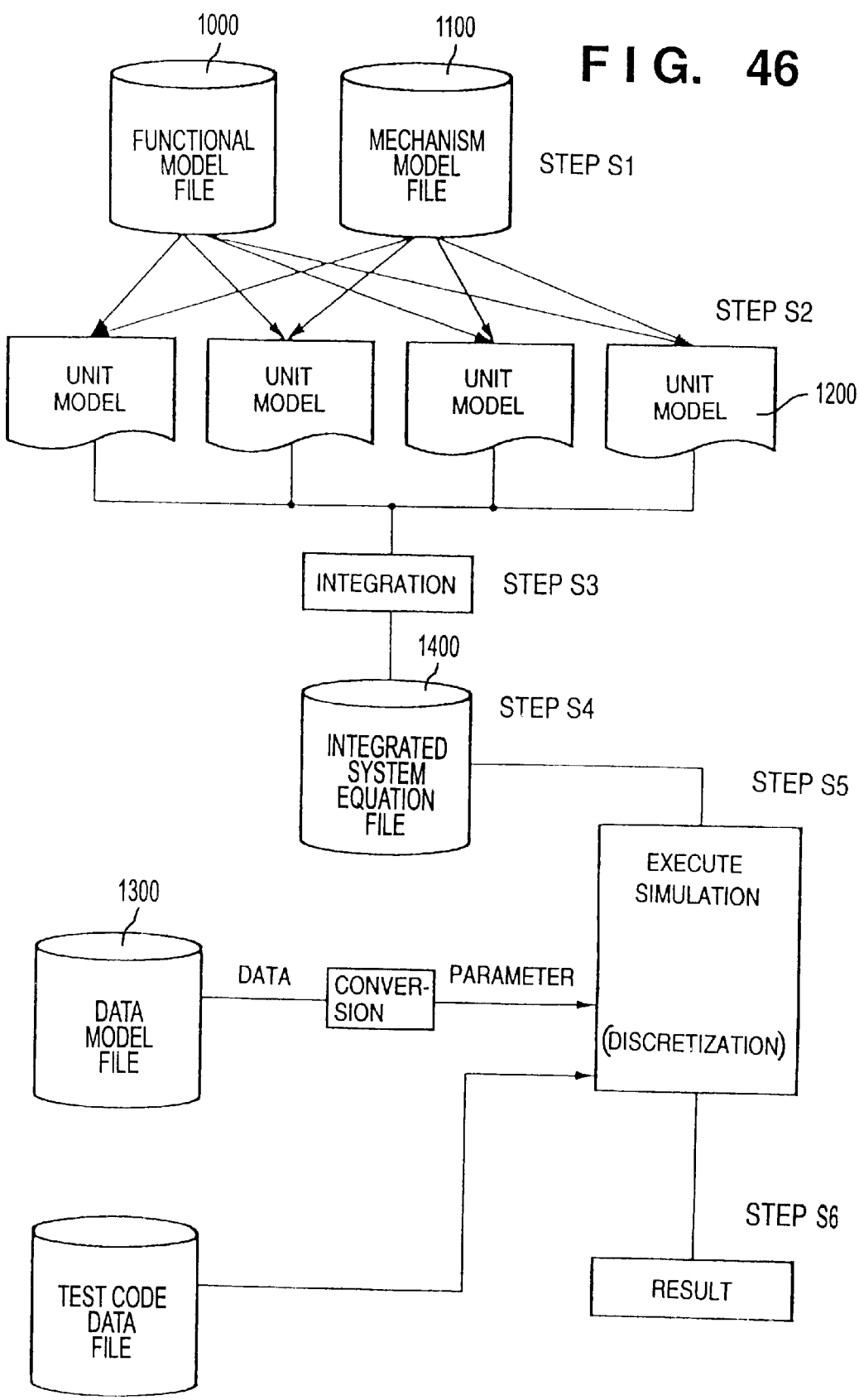
FIG. 46 is a flow chart for explaining the processes in the simulation apparatus according to the embodiment of the present invention in turn.

Referring to FIG. 46, a functional model file stores a functional model of each unit generated in advance as data. Generation of the functional model file is described in detail in Japanese Patent Application No. 7-250974 filed by the present applicant. Also, in FIG. 46, a mechanism model file 1100 stores data corresponding to the aforementioned "mechanism model" which may be implemented as software to run in a system according to FIG. 45, and a data model file 1300 stores, static characteristic data, e.g., physical characteristic data as functions or tables, as shown in FIG. 10, respectively for each unit (step S1).

The system of this embodiment registers as a unit model 1200 (step S2) each functional model (each functional model represented/defined as a system equation) and the mechanism model corresponding to each functional model. Then the system equations of each unit model 1200 can be integrated by the aforementioned method (step S3). This integration uses deletion of connected state variables, and generates an integrated system equation (step S3). The generated integrated system equation representing/defining the target apparatus can be stored in an integrated system equation file 1400 (step S4).

Simulation is done according to the integrated system equation (step S5). In the simulation, static characteristics are read out from the data model and provided to the "mechanism model", and are converted by the "mechanism model" into parameters to be supplied to the integrated system equation in each sampling clock. The integrated system equation is calculated/solved along a discrete time axis according to the aforementioned method, which may be referred to as discretization. The simulation progresses while repeating supply of parameters and discretization.

The aforementioned simulation outputs, for example, on display 4, a simulation result as shown in FIGS. 43 and 44 (step S6).

Figure 47:
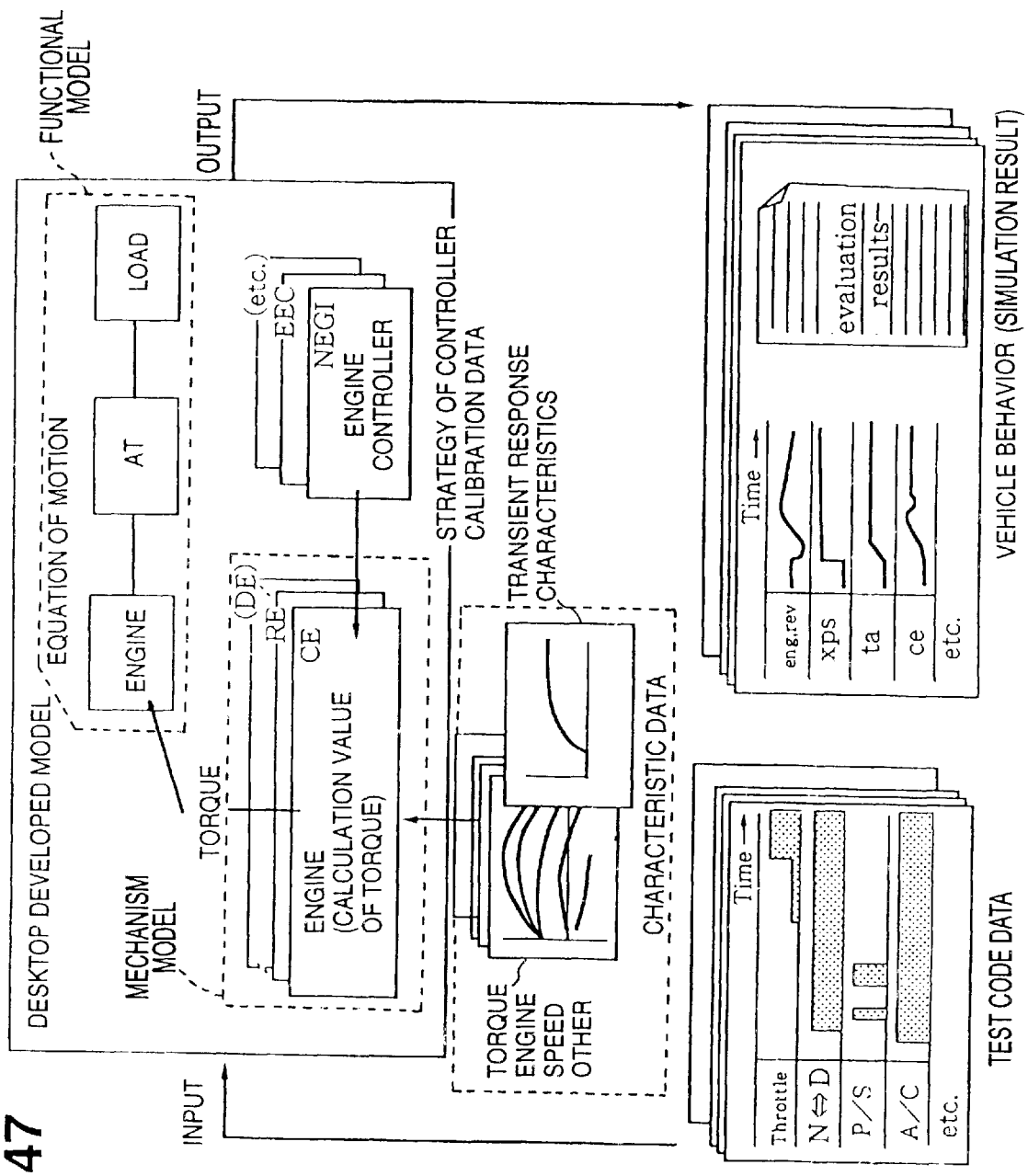
FIG. 47 is a chart for explaining the results obtained by the individual processes of the simulation apparatus according to the embodiment of the present invention.

FIG. 47 shows the overall simulation system completed by the method of the present invention, and illustrates that an integrated apparatus can be simulated efficiently based on the individual units of the vehicle.

As described above, according to the present invention, a plurality of kinds of units can be easily evaluated without changing models.

What is claimed is:

1. A simulation apparatus simulating dynamic performance of a target apparatus, which includes a plurality of units performing non-linear operation and energy is transmitted therebetween, said simulation apparatus comprising:

functional modeling means for modeling each unit by functional models, including at least a first parameter that determines dynamic performance of each respective unit, in which exchange of energy according to the dynamic performance of each unit is defined by product of a potential variable that expresses a potential of the energy and a flow variable that expresses a flow of the energy and coupling each of the functional models via a pair comprising the potential variable and the flow variable;

data storage means for storing, in advance, non-linear characteristic data of each unit as functions or tables;

data modeling means for, when simulation of the dynamic performance of the target apparatus is performed, generating, by using pre-stored mechanism models depending on an actual mechanism of each unit, at least a second parameter of each unit on the basis of the characteristic data for the respective unit read from said data storage means at every predetermined sampling period of time; and simulation control means for simulating the dynamic performance of the target apparatus by setting the generated second parameter as the first parameter of said coupled functional models at each predetermined sampling period of time and outputting a simulation result of the dynamic performance of the target apparatus.

2. The apparatus according to claim 1, wherein each first parameter to be set into said coupled functional models represents at least one of a mass, spring, and damper.

3. The apparatus according to claim 1, wherein said functional modeling means models the functional models of each unit by a matrix.

4. The apparatus according to claim 1, wherein the functional models of each unit is defined by a system equation.

5. The apparatus according to claim 1, wherein the second parameter to be set as the first parameter includes a state variable of each unit, and a state change variable upon infinitesimal state transition.

6. The apparatus according to claim 1, wherein a plurality of said data modeling means are provided in correspondence with types of the units.

7. The apparatus according to claim 1, wherein the first parameter is constant for the functional models, and said data modeling means generates and sets the second parameter at every predetermined sampling period of time so that the second parameter can be considered as the constant between the sampling period of time.

8. A simulation method simulating dynamic performance of a target apparatus, which includes a plurality of units performing non-linear operation and energy is transmitted therebetween, said method comprising:

modeling each unit by functional models, including at least a first parameter that determines dynamic performance of each respective unit, in which exchange of energy according to the dynamic performance of each unit is defined by product of a potential variable that expresses a potential of the energy and a flow variable that expresses a flow of the energy and coupling each of the functional models via a pair comprising the potential variable and the flow variable;

storing, in advance, non-linear characteristic data of each unit, as functions or tables, in a data storage;

when simulation of the dynamic performance of the target apparatus is performed, generating, by using pre-stored mechanism models depending on an actual mechanism of each unit, at least a second parameter of each unit on the basis of the characteristic data for the respective unit read from said data storage at every predetermined sampling period of time; and simulating the dynamic performance of the target apparatus by setting the generated second parameter as the first parameter of said coupled functional models at each predetermined sampling period of time and outputting a simulation result of the dynamic performance of the target apparatus.

9. A computer readable storage medium storing a computer program for making a computer perform a simulation of dynamic performance of a target apparatus, which includes a plurality of units performing non-linear operation and energy is transmitted therebetween, comprising:

modeling each unit by functional models, including at least a first parameter that determines dynamic performance of each respective unit, in which exchange of energy according to the dynamic performance of each unit is defined by product of a potential variable that expresses a potential of the energy and a flow variable that expresses a flow of the energy and coupling each of the functional models via a pair comprising the potential variable and the flow variable;

storing, in advance, non-linear characteristic data of each unit, as functions or tables, in a data storage;

when simulation of the dynamic performance of the target apparatus is performed, generating, by using pre-stored mechanism models depending on an actual mechanism of each unit, at least a second parameter of each unit on the basis of the characteristic data for the respective unit read from said data storage at every predetermined sampling period of time;

simulating the dynamic performance of the target apparatus by setting the generated second parameter as the first parameter of said coupled functional models at each predetermined sampling period of time and outputting a simulation result of the dynamic performance of the target apparatus.

10. The method according to claim 8, wherein the functional model of each unit is a matrix.

11. The method according to claim 8, wherein the first parameter is a constant of the functional models, and the second parameter is generated and set at each of the predetermined sampling period of time so that the set second parameter can be considered as the constant between the sampling period of time.

12. The method according to claim 8, wherein the second parameter to be set as the first parameter includes a state variable of each unit, and a state change variable upon infinitesimal state transition.

13. A computer readable storage medium according to claim 9, wherein the functional model of each unit is a matrix.

14. A computer readable storage medium according to claim 9, wherein the first parameter is a constant of the functional models, and the second parameter is generated and set at each of the predetermined sampling period of time so that the set second parameter can be considered as the constant between the sampling period of time.

15. A computer readable storage medium according to claim 9, wherein the second parameter to be set as the first parameter includes a state variable of each unit, and a state change variable upon infinitesimal state transition.

16. The apparatus according to claim 1, wherein the target apparatus is a power train, and the plurality of units correspond to at least a driving source and transmitting units transmitting a driving force output from the driving source.

17. The method according to claim 8, wherein the target apparatus is a power train, and the plurality of units correspond to at least a driving source and transmitting units transmitting a driving force output from the driving source.

18. The apparatus according to claim 1, wherein the non-linear characteristic data represents a characteristic curve, and said data modeling means calculates a tangent to the characteristic curve and generates, as the second parameter, a slope of the tangent and an intercept of the tangent.

19. The apparatus according to claim 16, wherein one of the transmitting units further corresponds to a planetary gear train that provides at least a total of three input portions and output portions, and said functional model means models, as the functional model of the planetary gear train, a gear model that includes at least a first data module, which corresponds to input/output lines to connect the input portions and the output portions, and a second data module, functioning in parallel with the first data module, that determines the dynamic performance of the gear model.

20. The apparatus according to claim 19, wherein the gear model further includes a third data module connected to the input/output lines and functioning as a variable control gain of the gear model.

21. The apparatus according to claim 19, wherein the gear model further includes a fourth data module functioning as a differential term of an inertia moment of a shaft provided in the planetary gear train.

22. The method according to claim 17, wherein one of the transmitting units further corresponds to a planetary gear train that provides at least a total of three input portions and output portions, and said modeling models, as the functional model of the planetary gear train, a gear model that includes at least a first data module, which corresponds to input/output lines to connect the input portions and the output portions, and a second data module, functioning in parallel with first data module, that determines the dynamic performance of the gear model.

23. The method according to claim 22, wherein the gear model further includes a third data module, which is connected to the input/output lines and functions as a variable control gain of the gear model.

24. The method according to claim 22, wherein the gear model further includes a fourth data module, which functions as a differential term of an inertia moment of a shaft provided in the planetary gear train.

25. A computer readable storage medium according to claim 9, wherein one of the transmitting units further corresponds to a planetary gear train that provides at least a total of three input portions and output portions, and said modeling models, as the functional model of the planetary gear train, a gear model that includes at least a first data module, which corresponds to input/output lines to connect the input portions and the output portions, and a second data module, functioning in parallel with first data module, that determines the dynamic performance of the gear model.

26. A computer readable storage medium according to claim 25, wherein the gear model further includes a third data module, which is connected to the input/output lines and functions as a variable control gain of the gear model.

27. A computer readable storage medium according to claim 25, wherein the gear model further includes a fourth data module, which functions as a differential term of an inertia moment of a shaft provided in the planetary gear train.

28. The method according to claim 8, wherein the non-linear characteristic data represents a characteristic curve, and said modeling calculates a tangent to the characteristic curve and generates, as the second parameter, a slope of the tangent and an intercept of the tangent.

29. A computer readable storage medium according to claim 9, wherein the non-linear characteristic data represents a characteristic curve, and said modeling calculates a tangent to the characteristic curve and generates, as the second parameter, a slope of the tangent and an intercept of the tangent.

30. A computer system simulating dynamic performance of a target apparatus, which includes a plurality of units performing non-linear operation and energy is transmitted therebetween, the computer system comprising:

a storage unit storing non-linear characteristic data of each unit as functions or tables; and a processor coupled to the storage unit, to model each unit by functional models that include at least a first parameter that determines dynamic performance of each respective unit, exchange of energy according to the dynamic performance of each unit being defined by product of a potential variable that expresses a potential of the energy and a flow variable that expresses a flow of the energy, to couple each of the functional models via a pair comprising the potential variable and the flow variable, to generate, when simulation of the dynamic performance of the target apparatus is performed and using mechanism models depending on an actual mechanism of each unit, at least a second parameter of each unit on the basis of the characteristic data read from the storage unit for the respective unit at every predetermined sampling period of time, to simulate and output a simulation result of the dynamic performance of the target apparatus by substituting the second parameter for the first parameter of said coupled functional models at each predetermined sampling period of time.

* * * * *

UNITED STATES PATENT AND TRADEMARK OFFICE
CERTIFICATE OF CORRECTION

PATENT NO. : 6,304,835 B1
DATED : October 16, 2001
INVENTOR(S) : Shigeki Hiramatsu et al.

It is certified that error appears in the above-identified patent and that said Letters Patent is hereby corrected as shown below:

Column 5,
Line 31, change "xangular" to -- x angular --.

Column 6,
Line 60, before "Note" insert -- In particular, the system equation is an equation including observed state variables (O, O1, O2, etc.,) as shown in Figs. 12 and 14. A state equation is an equation excluding the observed state variables. More particularly, in case of Figs. 12 and 14, X'=AX+BI (the state equation) and O=CX+DI, which includes the observed state variables, are obtained by solving the system equation. --

Column 9,
Line 12, change ">" to -- $\geq$ --;
Line 50, change "$\leqq$" to -- $\leq$ --.

Column 10,
Line 40, change "FC" to -- Fc --.

Column 11,
Line 34, change "$\omega^c$" to -- $\omega_c$ --;
Line 35, change "$\omega^{LS}LS$" to -- $\omega_{LS}$ --.

Column 13,
Line 44, insert -- , -- after "model";
Line 50, delete "each functional model" (first occurrence).

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,304,835 B1
DATED         : October 16, 2001
INVENTOR(S)   : Shigeki Hiramatsu et al.

It is certified that error appears in the above-identified patent and that said Letters Patent is hereby corrected as shown below:

<u>Title page,</u>
Item [56], OTHER PUBLICATIONS, 3rd entry, change "1986" to -- 1996 --.

Signed and Sealed this

Twelfth Day of August, 2003

JAMES E. ROGAN
*Director of the United States Patent and Trademark Office*